United States Patent
Zhang et al.

(10) Patent No.: US 12,200,790 B2
(45) Date of Patent: Jan. 14, 2025

(54) BLUETOOTH CONNECTION METHOD AND RELATED APPARATUS

(71) Applicant: HUAWEI TECHNOLOGIES CO., LTD., Guangdong (CN)

(72) Inventors: Jinming Zhang, Wuhan (CN); Xudong Tian, Wuhan (CN); Yixiu Hao, Shenzhen (CN); Liang Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 17/770,112

(22) PCT Filed: Sep. 25, 2020

(86) PCT No.: PCT/CN2020/117704
§ 371 (c)(1),
(2) Date: Apr. 19, 2022

(87) PCT Pub. No.: WO2021/082829
PCT Pub. Date: May 6, 2021

(65) Prior Publication Data
US 2022/0394794 A1    Dec. 8, 2022

(30) Foreign Application Priority Data

Oct. 31, 2019   (CN) ................... 201911053982.X

(51) Int. Cl.
*H04W 76/15* (2018.01)
(52) U.S. Cl.
CPC ................. *H04W 76/15* (2018.02)
(58) Field of Classification Search
CPC ........ H04W 76/15; H04W 4/80; H04W 76/10
See application file for complete search history.

(56) References Cited

U.S. PATENT DOCUMENTS

| 9,351,330 B2 * | 5/2016 | Weizman ................. H04W 4/80 |
| 10,772,112 B2 * | 9/2020 | Church ............... H04W 40/248 |

(Continued)

FOREIGN PATENT DOCUMENTS

| CN | 102474279 A | 5/2012 |
| CN | 104601203 A | 5/2015 |

(Continued)

OTHER PUBLICATIONS

Grocery store owner, Connection events, connection parameters and update methods of Bluetooth low energy BLE, 2016, https://blog.csdn.net/zahuopuboss/article/details/52995178, 12 pages.

(Continued)

*Primary Examiner* — Tuan H Nguyen

(57) ABSTRACT

A Bluetooth connection method and a related apparatus are disclosed, and relate to the field of short-range wireless communications technologies. A first electronic device establishes a BLE connection to a second electronic device, and exchanges data with the second electronic device based on a first connection interval. The first electronic device further establishes a BR/EDR connection to a third electronic device. When device class information of the second electronic device is the same as device class information prestored in a memory, the first electronic device exchanges data with the second electronic device based on a second connection interval. The second connection interval is greater than the first connection interval. In this way, a throughput speed of exchanging data by the third electronic device can be increased.

8 Claims, 22 Drawing Sheets

(56) References Cited

U.S. PATENT DOCUMENTS

| | | |
|---|---|---|
| 2013/0034005 A1 | 2/2013 | Xhafa et al. |
| 2015/0334488 A1 | 11/2015 | Kim et al. |
| 2016/0381633 A1 | 12/2016 | Chen |
| 2017/0187828 A1 | 6/2017 | Soji et al. |
| 2017/0223615 A1 | 8/2017 | Lee et al. |
| 2019/0028958 A1 | 1/2019 | Broerman et al. |
| 2019/0150215 A1 | 5/2019 | Li et al. |
| 2019/0174557 A1 | 6/2019 | Ueda et al. |

FOREIGN PATENT DOCUMENTS

| | | |
|---|---|---|
| CN | 105917590 A | 8/2016 |
| CN | 106332240 A | 1/2017 |
| CN | 106559735 A | 4/2017 |
| CN | 106559738 A | 4/2017 |
| CN | 107770852 A | 3/2018 |
| CN | 109039389 A | 12/2018 |
| CN | 110087223 A | 8/2019 |
| CN | 110234138 A | 9/2019 |
| CN | 110248341 A | 9/2019 |
| WO | 2016101743 A1 | 6/2016 |

OTHER PUBLICATIONS

Connection event, Popular science about the connection events and connection parameters of low-power bluetooth, it is worth collecting for bluetooth beginners , 2017, https://www.sohu.com/a/211187225_404276, 2 pages.

\* cited by examiner

BLUETOOTH CONNECTION METHOD AND RELATED APPARATUS

CROSS-REFERENCE TO RELATED APPLICATIONS

This application is a national stage of International Application No. PCT/CN2020/117704, filed on Sep. 25, 2020, which claims priority to Chinese Patent Application No. 201911053982.X, filed on Oct. 31, 2019. Both of the aforementioned applications are hereby incorporated by reference in their entireties.

TECHNICAL FIELD

This application relates to the field of short-range wireless communications technologies, and in particular, to a Bluetooth connection method and a related apparatus.

BACKGROUND

Bluetooth (Bluetooth) is a common manner of data transmission between electronic devices. Bluetooth can implement short-range wireless data transmission between electronic devices (for example, mobile phones, notebook computers, palmtop computers, wireless headsets, smart speakers, and smartwatches), and has advantages of convenience, flexibility, and security.

Currently, an electronic device may establish Bluetooth connections to a plurality of Bluetooth devices. After the Bluetooth connections are established, a channel of the electronic device may be allocated to the plurality of Bluetooth devices in a time division multiplexing manner. To be specific, the electronic device may exchange data with one of the Bluetooth devices in a time period, and exchange data with the plurality of Bluetooth devices in different time periods.

However, when an amount of data that needs to be transmitted between one of the Bluetooth devices and the electronic device is relatively large, for example, when audio data is transmitted between the Bluetooth device and the electronic device, because time of the channel of the electronic device needs to be allocated to another Bluetooth device to exchange data, a transmission latency of audio data with a relatively large data amount is relatively long, and a data throughput speed is relatively low. The audio data needs to wait for a period of time to complete transmission. This reduces real-time performance of audio data transmission.

SUMMARY

This application provides a Bluetooth connection method and a related apparatus. When a headset is connected to a first electronic device, a connection interval of a connected band is increased, so that time for exchanging data between the headset and a mobile phone is increased, and a throughput speed of exchanging data by the headset can be increased.

According to a first aspect, this application provides a first electronic device. The first electronic device includes: one or more processors; a memory, where the memory is configured to prestore device class information; a Bluetooth chip, where the Bluetooth chip supports a classic Bluetooth BR/EDR function and a Bluetooth low energy BLE function; a plurality of applications; and one or more computer programs, where the one or more computer programs are stored in the memory, the one or more computer programs include instructions, and when the instructions are executed by the first electronic device, the first electronic device is enabled to perform the following steps: establishing a BLE connection to a second electronic device, and exchanging data with the second electronic device based on a first connection interval; establishing a BR/EDR connection to a third electronic device; and when device class information of the second electronic device is the same as the device class information prestored in the memory, exchanging data with the second electronic device based on a second connection interval, where the second connection interval is greater than the first connection interval.

The first electronic device provided in the first aspect may implement the following: if the device class information of the second electronic device is the same as the prestored device class information, when the third electronic device is connected to the first electronic device, an action of adjusting a connection interval of the second electronic device is triggered. The first electronic device increases the connection interval of the second electronic device, and time for which a connection event of the second electronic device occupies a channel of the first electronic device is reduced. Therefore, time reserved for the third electronic device to exchange data with the first electronic device is increased, thereby improving a throughput speed of exchanging data between the third electronic device and the first electronic device.

For example, the first electronic device is a mobile phone, the second electronic device is a band, and the third electronic device is a headset. When the band establishes a BLE Bluetooth connection to the mobile phone, the mobile phone may obtain device class information of the band. Further, the mobile phone may compare the device class information of the band with the prestored device class information, and obtain a priority corresponding to the device class information of the band. When the mobile phone is connected to the headset, an action of adjusting a connection interval of the band is triggered. The mobile phone can increase the connection interval of the band. In this way, time for which a connection event of the band occupies a channel of the mobile phone is reduced. Therefore, time reserved for the headset and the mobile phone to exchange data is increased, thereby improving a throughput speed of exchanging data between the headset and the mobile phone.

That device class information of the second electronic device is the same as the device class information prestored in the memory means that the prestored device class information includes the device class information of the second electronic device.

In a possible implementation, the memory is specifically configured to prestore the device class information and a corresponding priority; and when the instructions are executed by the first electronic device, the first electronic device is enabled to further perform the following step: establishing a BLE connection to a fourth electronic device. In the memory, the device class information of the second electronic device has a first priority, device class information of the fourth electronic device has a second priority, and the second priority is higher than the first priority. When the instructions are executed by the first electronic device, the first electronic device is enabled to specifically perform the following step: adjusting a connection interval of the second electronic device to the second connection interval based on the first priority and the second priority.

The first electronic device is connected to a plurality of Bluetooth devices (namely, the second electronic device and the fourth electronic device). When the third electronic device is connected, the first electronic device may select a Bluetooth device (for example, the second electronic device) with a lowest priority from the plurality of Bluetooth devices based on the priority of the prestored device class information, to adjust the connection interval. In this way, a case in which a throughput speed of a Bluetooth connection of the fourth electronic device decreases can be reduced.

For example, the first electronic device is a mobile phone, the second electronic device is a band, the third electronic device is a headset, and the fourth electronic device is a stylus. When the mobile phone establishes a BLE Bluetooth connection to the band or stylus, the mobile phone can obtain device class information of the band or stylus. The mobile phone may further determine, based on the prestored device class information and priority, that a priority of the device class information of the stylus is higher than a priority of the device class information of the band. When the headset is connected, the mobile phone can increase a Bluetooth interval of the band based on the priority of the device class information of the stylus and the priority of the device class information of the band.

In this embodiment of this application, a Bluetooth device whose priority of device class information is the first priority may include the band, a watch, a Bluetooth keyboard, and a Bluetooth mouse. A Bluetooth device whose priority of device class information is the second priority may include the stylus. The first electronic device may further store device class information whose priority is a third priority. The third priority may be higher than the first priority and higher than the second priority. The Bluetooth device whose priority of device class information is the first priority may include a conventional Bluetooth device. The third electronic device includes, for example, a Bluetooth headset or a Bluetooth sound box, and may establish a BR/EDR connection to the first electronic device.

In a possible implementation, the device class information of the second electronic device is obtained based on either of the following two: (1) The device class information of the second electronic device is obtained based on device class information CoD information carried in an advertisement of the second electronic device; (2) PNP infor included in a device information service DIS in a generic attribute profile GATT.

(1) The device class information of the second electronic device is obtained based on CoD.

In this embodiment of this application, the CoD information of the second electronic device may include a major device class, or may include a minor device class. Device class information prestored in the first electronic device may also be based on the major device class, or may be based on the minor device class.

In a possible implementation, the CoD information is carried in an EIR data packet or an advertising (advertising) data packet.

In some embodiments, in a process in which the first electronic device pairs with and connects to the second electronic device, the first electronic device may obtain a capability parameter of the second electronic device, for example, obtain a class or a version number of a Bluetooth service (profile) supported by the second electronic device. The first electronic device may further determine a device class of a peer device by using the class of the Bluetooth service supported by the second electronic device. For example, if the second electronic device supports an advanced audio distribution profile A2DP and/or an HFP service, it may be determined that the second electronic device is an audio/video device. For another example, if the second electronic device supports the GATT, the second electronic device may be a BLE device.

(2) The device class information of the second electronic device is obtained based on the PNP infor included in the DIS.

The PNP infor includes a number assigned by a global organization to a vendor, a product ID defined by the vendor, and product version information defined by the vendor. For example, the PNP infor includes a vendor ID and a product ID. The vendor ID and the product ID may identify that the Bluetooth device is a device manufactured by Huawei Technologies Co., Ltd., and may also identify device class information, for example, a keyboard, a mouse, or a band.

In a possible implementation, the second electronic device is any one or more of the following: the band, the watch, the Bluetooth keyboard, and the Bluetooth mouse; and the fourth electronic device is the stylus.

According to a second aspect, this application provides a first electronic device. The first electronic device includes: one or more processors; a memory; a Bluetooth chip, where the Bluetooth chip supports a classic Bluetooth BR/EDR function and a Bluetooth low energy BLE function; a plurality of applications; and one or more computer programs, where the one or more computer programs are stored in the memory, the one or more computer programs include instructions, and when the instructions are executed by the first electronic device, the first electronic device is enabled to perform the following steps: establishing a BLE connection to a second electronic device, and exchanging data with the second electronic device based on a third connection interval; establishing a BR/EDR connection to a third electronic device; and exchanging data with the second electronic device based on a fourth connection interval when data exchanged with the third electronic device is audio data, where the fourth connection interval is greater than the third connection interval.

The first electronic device provided in the second aspect may implement the following: when the data exchanged with the third electronic device is the audio data, an action of adjusting a connection interval of the second electronic device is triggered. The first electronic device increases the connection interval of the second electronic device, and time for which a connection event of the second electronic device occupies a channel of the first electronic device is reduced. Therefore, time reserved for the third electronic device to exchange data with the first electronic device is increased, thereby increasing a throughput speed of exchanging data between the third electronic device and the first electronic device.

For example, a Bluetooth device A and a Bluetooth device B have established a BLE connection to the first electronic device. Connection intervals of the Bluetooth device A and the Bluetooth device B are respectively 10 ms and 15 ms. When a Bluetooth device C accesses the first electronic device through Bluetooth, the first electronic device may adjust the connection interval of the Bluetooth connection between the first electronic device and the Bluetooth device A to 15 ms, and adjust the connection interval of the Bluetooth connection between the first electronic device and the Bluetooth device B to 18 ms based on one or more of Bluetooth profiles and device class information of the Bluetooth devices A and B. The first electronic device transmits high voice quality coded audio data to the Bluetooth device C through the Bluetooth connection, and data exchanged between the first electronic device 100 and the Bluetooth device A or the Bluetooth device B is heartbeat data, sleep data, or a control signal. The first electronic device may adjust the connection interval of the Bluetooth connection between the first electronic device and the Bluetooth device A to 20 ms, and adjust the connection interval of the Bluetooth connection between the first electronic device and the Bluetooth device B to 25 ms.

The data exchanged between the first electronic device and the second electronic device may be heartbeat data, sleep data, or an empty data packet.

In a possible implementation, when the instructions are executed by the first electronic device, the first electronic device is enabled to specifically perform the following step: when a codec format of the data exchanged with the third electronic device is one or more of LDAC, high-resolution wireless audio HWA, aptX HD, and advanced audio coding AAC, exchanging data with the second electronic device based on the fourth connection interval.

In a possible implementation, the first electronic device further includes a touchscreen, and the touchscreen includes a touch-sensitive surface and a display. Before the data exchanged between the first electronic device and the third electronic device is the audio data, when the instructions are executed by the first electronic device, the first electronic device further performs the following step: receiving a first user operation for playing audio.

A user operation for playing audio may include: a user operation performed on a play control (in a paused state) on an audio playback interface, a user operation performed on an answer control on an incoming call interface, a user operation performed on a Bluetooth headset option on an audio switching interface, and a user operation performed on a control used to play audio and videos on a video playback interface.

In a possible implementation, when the instructions are executed by the first electronic device, the first electronic device is enabled to further perform the following step: exchanging data with the second electronic device based on a fifth connection interval when the data exchanged with the third electronic device is empty data or a control signal, where the fifth connection interval is less than the fourth connection interval.

In a possible implementation, before the data exchanged between the first electronic device and the third electronic device is the empty data or the control signal, when the instructions are executed by the first electronic device, the first electronic device further performs the following step: receiving a second user operation for pausing audio playback.

The second user operation for pausing audio playback may include a user operation performed on a play control (in a playing state) on the audio playback interface.

When the data exchanged with the third electronic device is the audio data, data is exchanged with the second electronic device based on a fourth connection parameter. The fourth connection parameter may include the fourth connection interval, a fourth latency, and fourth supervision timeout. The fourth connection interval may be greater than the third connection interval. The fourth connection interval, the fourth latency, and the fourth supervision timeout may meet: the fourth supervision timeout>(1+the fourth latency)×the fourth connection interval×2.

According to a third aspect, this application provides a chip system, disposed in a first electronic device. The chip system includes a Bluetooth chip and a processor. The Bluetooth chip is configured to: establish a Bluetooth low energy BLE connection to a second electronic device, and exchange data with the second electronic device based on a first connection interval. The Bluetooth chip is further configured to establish a BR/EDR connection to a third electronic device. The processor is configured to: when device class information of the second electronic device is the same as device class information prestored in a memory, adjust a connection interval of the second electronic device to a second connection interval. The Bluetooth chip is further configured to exchange data with the second electronic device based on the second connection interval. The second connection interval is greater than the first connection interval.

When the chip system provided in the third aspect is applied to the first electronic device, the following may be implemented: if the device class information of the second electronic device is the same as the prestored device class information, when the third electronic device is connected to the first electronic device, an action of adjusting a connection interval of the second electronic device is triggered. The first electronic device increases the connection interval of the second electronic device, and time for which a connection event of the second electronic device occupies a channel of the first electronic device is reduced. Therefore, time reserved for the third electronic device to exchange data with the first electronic device is increased, thereby increasing a throughput speed of exchanging data between the third electronic device and the first electronic device.

In a possible implementation, the Bluetooth chip is further configured to establish a BLE connection to a fourth electronic device. The device class information of the second electronic device has a first priority, device class information of the fourth electronic device has a second priority, and the second priority is higher than the first priority. The processor is specifically configured to adjust the connection interval of the second electronic device to the second connection interval based on the first priority and the second priority.

In a possible implementation, the device class information of the second electronic device is obtained based on PNP infor included in a device information service DIS in a generic attribute profile GATT; or the device class information of the second electronic device is obtained based on device class information CoD information carried in an advertisement of the second electronic device.

In a possible implementation, the CoD information is carried in an EIR data packet or an advertising (advertising) data packet.

According to a fourth aspect, this application provides a chip system, disposed in a first electronic device. The chip system includes a Bluetooth chip and a processor. The Bluetooth chip is configured to: establish a Bluetooth low energy BLE connection to a second electronic device, and exchange data with the second electronic device based on a third connection interval. The Bluetooth chip is further configured to establish a classic Bluetooth BR/EDR connection to a third electronic device. The processor is configured to: when detecting that data exchanged with the third electronic device is audio data, adjust a connection interval of the second electronic device to a fourth connection interval. The Bluetooth chip is further configured to exchange data with the second electronic device based on the fourth connection interval. The fourth connection interval is greater than the third connection interval.

When the chip system provided in the fourth aspect is applied to the first electronic device, the following may be implemented: when the data exchanged with the third electronic device is the audio data, an action of adjusting a connection interval of the second electronic device is triggered. The first electronic device increases the connection interval of the second electronic device, and time for which a connection event of the second electronic device occupies a channel of the first electronic device is reduced. Therefore, time reserved for the third electronic device to exchange data with the first electronic device is increased, thereby increasing a throughput speed of exchanging data between the third electronic device and the first electronic device.

In a possible implementation, the processor is specifically configured to: when a codec format of the data exchanged with the third electronic device is one or more of LDAC, high-resolution wireless audio HWA, aptX HD, and advanced audio coding AAC, adjust the connection interval of the second electronic device to the fourth connection interval.

In a possible implementation, the processor is further configured to: adjust the connection interval of the second electronic device to a fifth connection interval when the data exchanged with the third electronic device is empty data or a control signal. The Bluetooth chip is further configured to exchange data with the second electronic device based on the fifth connection interval. The fifth connection interval is less than the fourth connection interval.

According to a fifth aspect, this application provides a Bluetooth connection method. The method is applied to a first electronic device, the first electronic device prestores device class information, and the method includes: establishing a Bluetooth low energy BLE connection to a second electronic device, and exchanging data with the second electronic device based on a first connection interval; establishing a classic Bluetooth BR/EDR connection to a third electronic device; and when device class information of the second electronic device is the same as the device class information prestored in the first electronic device, exchanging data with the second electronic device based on a second connection interval, where the second connection interval is greater than the first connection interval.

In the Bluetooth connection method according to the fifth aspect, if the device class information of the second electronic device is the same as the prestored device class information, when the third electronic device is connected to the first electronic device, an action of adjusting a connection interval of the second electronic device is triggered. The first electronic device increases the connection interval of the second electronic device, and time for which a connection event of the second electronic device occupies a channel of the first electronic device is reduced. Therefore, time reserved for the third electronic device to exchange data with the first electronic device is increased, thereby increasing a throughput speed of exchanging data between the third electronic device and the first electronic device.

In a possible implementation, the first electronic device prestores the device class information and a corresponding priority, and before the establishing a BR/EDR connection to a third electronic device, the method further includes: establishing a BLE connection to a fourth electronic device. The device class information of the second electronic device has a first priority, device class information of the fourth electronic device has a second priority, and the second priority is higher than the first priority. The exchanging data with the second electronic device based on a second connection interval based on the device class information of the second electronic device and the device class information prestored in the first electronic device includes: adjusting a connection interval of the second electronic device to the second connection interval based on the first priority and the second priority.

In a possible implementation, the device class information of the second electronic device is obtained based on PNP infor included in a device information service DIS in a generic attribute profile GATT; or the device class information of the second electronic device is obtained based on device class information CoD information carried in an advertisement of the second electronic device.

In a possible implementation, the CoD information is carried in an EIR data packet or an advertising (advertising) data packet.

According to a sixth aspect, this application provides a Bluetooth connection method. The method includes: A first electronic device establishes a Bluetooth low energy BLE connection to a second electronic device, and exchanges data with the second electronic device based on a third connection interval. The first electronic device establishes a classic Bluetooth BR/EDR connection to a third electronic device; and the first electronic device exchanges data with the second electronic device based on a fourth connection interval when data exchanged with the third electronic device is audio data. The fourth connection interval is greater than the third connection interval.

In the Bluetooth connection method provided in the sixth aspect, when the data exchanged with the third electronic device is the audio data, an action of adjusting a connection interval of the second electronic device is triggered. The first electronic device increases the connection interval of the second electronic device, and time for which a connection event of the second electronic device occupies a channel of the first electronic device is reduced. Therefore, time reserved for the third electronic device to exchange data with the first electronic device is increased, thereby increasing a throughput speed of exchanging data between the third electronic device and the first electronic device.

In a possible implementation, that the first electronic device exchanges data with the second electronic device based on a fourth connection interval when data exchanged with the third electronic device is audio data includes: When a codec format of the data exchanged with the third electronic device is one or more of LDAC, high-resolution wireless audio HWA, aptX HD, and advanced audio coding AAC, the first electronic device exchanges the data with the second electronic device based on the fourth connection interval.

In a possible implementation, before the data exchanged between the first electronic device and the third electronic device is the audio data, the method further includes: The first electronic device receives a first user operation for playing audio.

In a possible implementation, after the first electronic device exchanges data with the second electronic device based on a fourth connection interval, the method further includes: The first electronic device exchanges data with the second electronic device based on a fifth connection interval when the data exchanged with the third electronic device is empty data or a control signal. The fifth connection interval is less than the fourth connection interval.

In a possible implementation, before that the first electronic device exchanges data with the second electronic device based on a fifth connection interval when the data exchanged with the third electronic device is empty data or a control signal, the method further includes: The first electronic device receives a second user operation for pausing audio playback.

According to a seventh aspect, an embodiment of this application provides a computer storage medium, including computer instructions. When the computer instructions are run on a first electronic device, the first electronic device is enabled to perform the method in any one of the fifth aspect, the sixth aspect, the possible implementations of the fifth aspect, or the possible implementations of the sixth aspect.

According to an eighth aspect, an embodiment of this application provides a computer program product. When the computer program product runs on a computer, the computer is enabled to perform the method in any one of the fifth aspect, the sixth aspect, the possible implementations of the fifth aspect, or the possible implementations of the sixth aspect.

It may be understood that both the computer storage medium provided in the seventh aspect and the computer program product provided in the eighth aspect are configured to perform the method provided in embodiments of this application and implement the device provided in embodiments of this application. Therefore, for beneficial effects that can be achieved, refer to beneficial effects in a corresponding method and device. Details are not described herein again.

DESCRIPTION OF EMBODIMENTS

The following clearly describes the technical solutions in embodiments of this application in detail with reference to the accompanying drawings. In descriptions of embodiments of this application, unless otherwise stated, "/" indicates "or". For example, A/B may indicate A or B. The word "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following describes a system architecture provided in an embodiment of this application.

Figure 1:
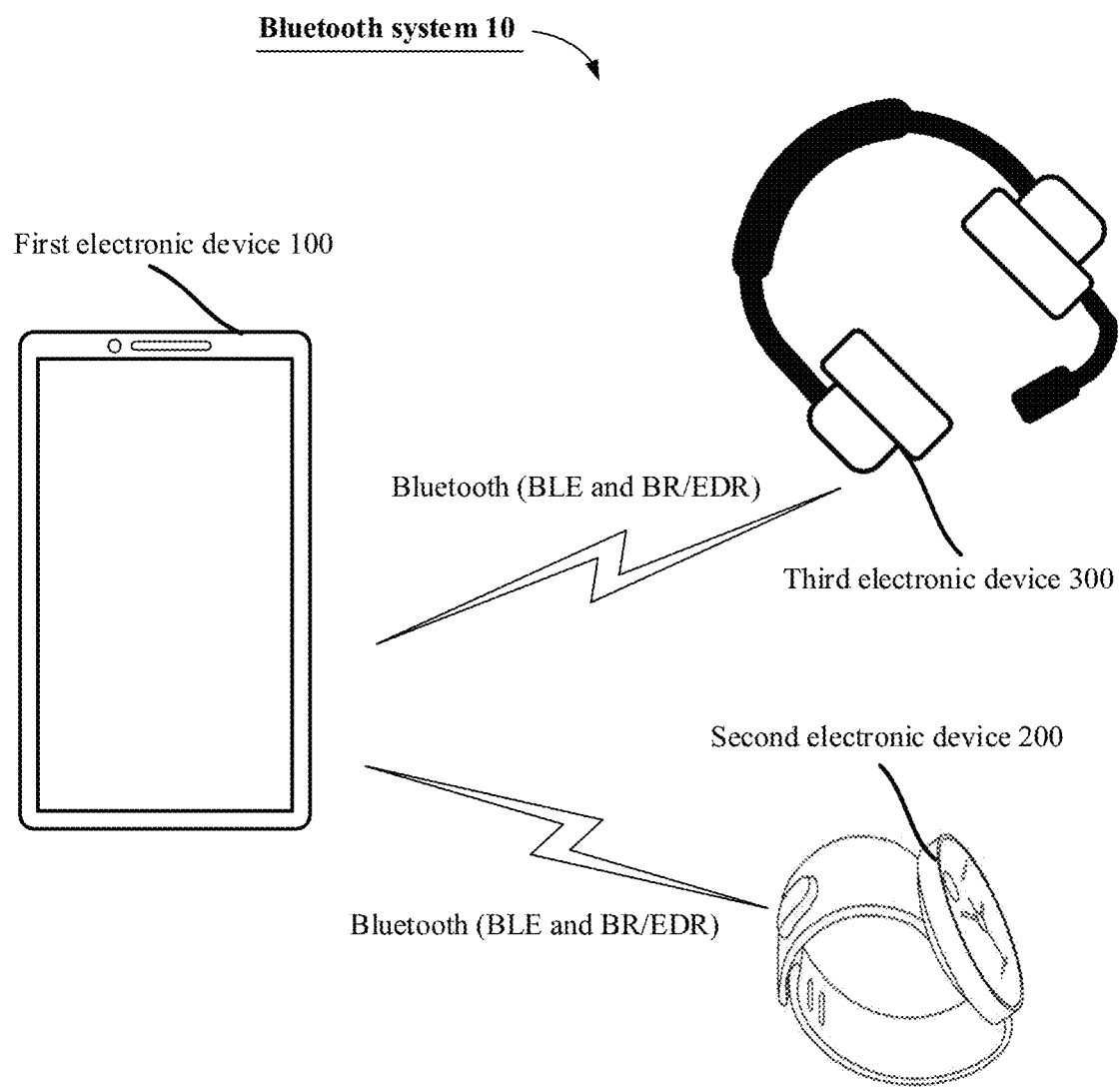
FIG. 1 is a schematic diagram of an architecture of a Bluetooth system 10 according to an embodiment of this application.

FIG. 1 is a schematic diagram of an architecture of a Bluetooth system 10 according to an embodiment of this application. As shown in FIG. 1, the Bluetooth system 10 may include a first electronic device 100, a second electronic device 200, and a third electronic device 300.

The first electronic device 100 may establish a Bluetooth connection to the second electronic device 200 by using Bluetooth technologies (including classic Bluetooth BR/EDR (Basic Rate/Enhanced Data Rate) and Bluetooth low energy (Bluetooth low energy, BLE)). The first electronic device 100 may further establish a Bluetooth connection to the third electronic device 300.

The first electronic device 100 may be a host (master), and may be specifically implemented as a terminal device supporting a Bluetooth function, such as a mobile phone, a notebook computer, or a palmtop computer. The second electronic device 200 and the third electronic device 300 may be a slave (slave), and may be specifically implemented as a terminal device supporting a Bluetooth function, such as a wireless (Bluetooth) headset, a smart speaker, a smartwatch, a portable media playback device, and an in-vehicle media playback device.

The first electronic device 100 and the second electronic device 200 may support the BLE and/or the BR/EDR, and may further support different versions of Bluetooth protocols, for example, Bluetooth versions 1.0, 1.2, 2.0+EDR, 3.0+HS, 4.0, 4.1, 4.2, and 5.0.

Figure 2A:
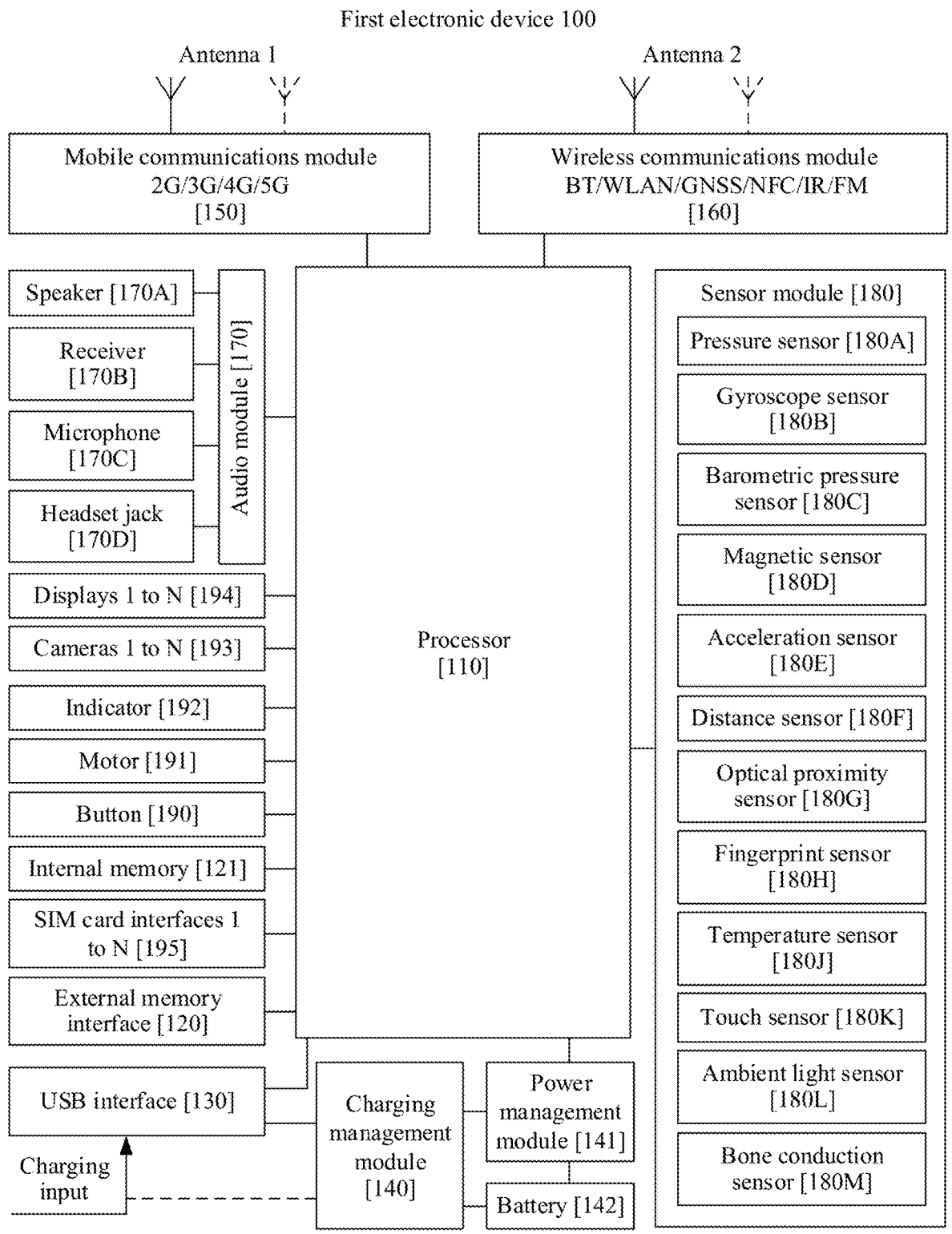
FIG. 2A is a schematic diagram of a structure of a first electronic device 100.

FIG. 2A is a schematic diagram of a structure of the first electronic device 100.

The following uses the first electronic device 100 to provide specific descriptions. It should be understood that the first electronic device 100 shown in FIG. 2A is merely an example, and the first electronic device 100 may have more or fewer components than those shown in FIG. 2A, or two or more components may be combined, or different component configurations may be used. Various components shown in the figure may be implemented by using hardware including one or more signal processing and/or application-specific integrated circuits, software, or a combination of hardware and software.

The first electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the first electronic device 100. The controller may generate an operation control signal based on instruction operation code and a time sequence signal, to complete control of instruction reading and instruction execution.

A memory may be further disposed in the processor 110, and is configured to store instructions and data.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL).

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170.

The PCM interface may also be used to perform audio communication, and sample, quantize, and code an analog signal. In some embodiments, the audio module 170 may be coupled to the wireless communications module 160 through a PCM bus interface.

The UART interface is a universal serial data bus, and is used to perform asynchronous communication. The bus may be a two-way communications bus. The bus switches to-be-transmitted data between serial communication and parallel communication. In some embodiments, the UART interface is usually used to connect the processor 110 to the wireless communications module 160.

The MIPI interface may be configured to connect the processor 110 to a peripheral component such as the display 194 or the camera 193. The MIPI interface includes a camera serial interface (camera serial interface, CSI), a display serial interface (display serial interface, DSI), or the like.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like.

It may be understood that an interface connection relationship between the modules that is shown in this embodiment of the present invention is merely an example for description, and constitutes no limitation on the structure of the first electronic device 100. In some other embodiments of this application, the first electronic device 100 may alternatively use an interface connection mode different from that in the foregoing embodiment, or use a combination of a plurality of interface connection modes.

The charging management module 140 is configured to receive a charging input from a charger. The charger may be a wireless charger or a wired charger. In some embodiments of wired charging, the charging management module 140 may receive a charging input from the wired charger through the USB interface 130.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like.

A wireless communication function of the first electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the first electronic device 100 may be configured to cover one or more communications bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution that is applied to the first electronic device 100 and that includes wireless communication such as 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in the same device as the mobile communications module 150 or another function module.

The wireless communications module 160 may provide a wireless communication solution that is applied to the first electronic device 100 and that includes a wireless local area network (wireless local area network, WLAN) (for example, a wireless fidelity (wireless fidelity, Wi-Fi) network), a BR/EDR, BLE, a global navigation satellite system (global navigation satellite system, GNSS), frequency modulation (frequency modulation, FM), near field communication (near field communication, NFC), and an infrared (infrared, IR) technology. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the first electronic device 100, the antenna 1 and the mobile communications module 150 are coupled, and the antenna 2 and the wireless communications module 160 are coupled, so that the first electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), a BR/EDR (Basic Rate/Enhanced Data Rate), a GNSS, a WLAN, NFC, FM, and/or an IR technology. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The first electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like.

The first electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image.

The camera 193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the first electronic device 100 may include one or N cameras 193, where N is a positive integer greater than 1.

The digital signal processor is configured to process a digital signal, and may process another digital signal in addition to the digital image signal. For example, when the first electronic device 100 selects a frequency, the digital signal processor is configured to perform Fourier transformation on frequency energy.

The video codec is configured to compress or decompress a digital video. The first electronic device 100 may support one or more video codecs. In this way, the first electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. An application such as intelligent cognition, for example, image recognition, facial recognition, speech recognition, or text understanding of the first electronic device 100 may be implemented by using the NPU.

The external memory interface 120 may be configured to connect to an external memory card, for example, a micro SD card, to expand a storage capability of the first electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 executes various function applications and data processing of the first electronic device 100 by running the instructions stored in the internal memory 121. The internal memory 121 may include a program storage area and a data storage area. The program storage area may store an operating system, an application required by at least one function (such as a sound playing function or an image playing function), and the like. The data storage area may store data (for example, audio data and a phone book) and the like created during use of the first electronic device 100. In addition, the internal memory 121 may include a high-speed random access memory, and may further include a nonvolatile memory such as at least one magnetic disk storage device, a flash memory, or a universal flash storage (universal flash storage, UFS).

The first electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The first electronic device 100 may be used to listen to music or answer a call in a hands-free mode through the speaker 170A.

The receiver 170B, also referred to as an "earpiece", is configured to convert an audio electrical signal into a sound signal. When a call is answered or voice information is received through the first electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C, to input the sound signal to the microphone 170C. At least one microphone 170C may be disposed in the first electronic device 100.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The first electronic device 100 determines intensity of pressure based on the change in the capacitance. When a touch operation is performed on the display 194, the first electronic device 100 detects intensity of the touch operation by using the pressure sensor 180A. The first electronic device 100 may also calculate a touch location based on a detection signal of the pressure sensor 180A. In some embodiments, touch operations that are performed at a same touch location but have different touch operation intensity may correspond to different operation instructions.

The gyroscope sensor 180B may be configured to determine a motion posture of the first electronic device 100. In some embodiments, an angular velocity of the first electronic device 100 around three axes (namely, axes x, y, and z) may be determined by using the gyroscope sensor 180B. The gyroscope sensor 180B may be configured to perform image stabilization during photographing.

The barometric pressure sensor 180C is configured to measure barometric pressure. In some embodiments, the first electronic device 100 calculates an altitude based on a barometric pressure value measured by the barometric pressure sensor 180C, to assist in positioning and navigation.

The magnetic sensor 180D includes a Hall sensor. The first electronic device 100 may detect opening and closing of a flip cover by using the magnetic sensor 180D. In some embodiments, when the first electronic device 100 is a flip phone, the first electronic device 100 may detect opening and closing of a flip cover through the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the first electronic device 100, and may detect magnitude and a direction of gravity when the first electronic device 100 is static. The acceleration sensor 180E may be further configured to identify a terminal posture, and is applied to applications such as screen switching between landscape and portrait modes and a pedometer.

The distance sensor 180F is configured to measure a distance. The first electronic device 100 may measure the distance through infrared or a laser. In some embodiments, in a photographing scenario, the first electronic device 100 may measure a distance by using the distance sensor 180F to implement quick focusing.

The optical proximity sensor 180G may include a light-emitting diode (LED) and an optical detector, for example, a photodiode. The light-emitting diode may be an infrared light-emitting diode. The first electronic device 100 emits infrared light through the light-emitting diode. The first electronic device 100 detects infrared reflected light from a nearby object through the photodiode. When detecting sufficient reflected light, the first electronic device 100 may determine that there is an object near the first electronic device 100. When detecting insufficient reflected light, the first electronic device 100 may determine that there is no object near the first electronic device 100. The first electronic device 100 may detect, through the optical proximity sensor 180G, that the user holds the first electronic device 100 close to an ear during a call, so that the first electronic device 100 automatically turns off a screen for power saving. The optical proximity sensor 180G may also be used in a smart cover mode or a pocket mode to automatically perform screen unlocking or locking.

The ambient light sensor 180L is configured to sense ambient light brightness. The first electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the first electronic device 100 is in a pocket, to avoid an accidental touch.

The fingerprint sensor 180H is configured to collect a fingerprint. The first electronic device 100 may use a feature of the collected fingerprint to implement fingerprint-based unlocking, application lock accessing, fingerprint-based photographing, fingerprint-based call answering, and the like.

The temperature sensor 180J is configured to detect a temperature. In some embodiments, the first electronic device 100 executes a temperature processing policy based on the temperature detected by the temperature sensor 180J. For example, when the temperature reported by the temperature sensor 180J exceeds a threshold, the first electronic device 100 degrades performance of a processor near the temperature sensor 180J, to reduce power consumption for thermal protection. In some other embodiments, when the temperature is less than another threshold, the first electronic device 100 heats the battery 142, to avoid a case in which the first electronic device 100 is shut down abnormally due to a low temperature. In some other embodiments, when the temperature is less than still another threshold, the first electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. A visual output related to the touch operation may be provided through the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The first electronic device 100 may receive a key input, and generate a key signal input related to a user setting and function control of the first electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with and separation from the first electronic device 100. The first electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may be compatible with different types of SIM cards. The SIM card interface 195 may also be compatible with the external storage card. The first electronic device 100 interacts with a network through the SIM card, to implement a call function, a data communication function, and the like. In some embodiments, the first electronic device 100 uses an eSIM, namely, an embedded SIM card. The eSIM card may be embedded in the first electronic device 100, and cannot be separated from the first electronic device 100.

Figure 2B:
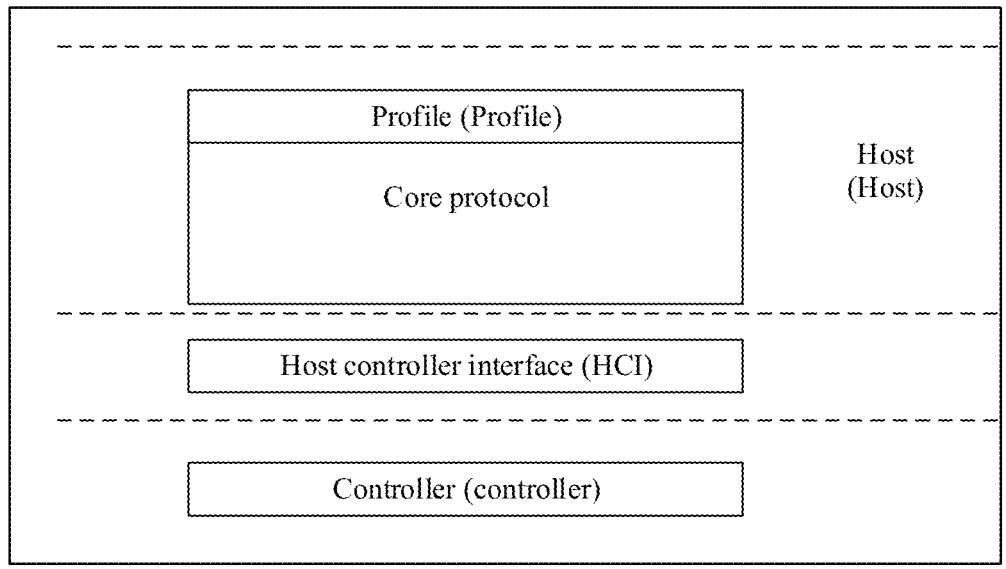
FIG. 2B is a schematic diagram of a Bluetooth protocol framework according to an embodiment of this application.

As shown in FIG. 2B, an embodiment of this application provides a schematic diagram of a Bluetooth protocol framework, including but not limited to a host (host) protocol stack, an HCI (Host Controller Interface), and a controller (controller).

The host protocol stack defines a plurality of profiles (profiles) and core protocols (protocols) in a Bluetooth framework, each profile defines a corresponding message format and application rule, and the profile is a Bluetooth service (Application). To implement interconnection between devices on different platforms, the Bluetooth protocol defines specifications for various possible and universal application scenarios, such as an A2DP (advanced audio distribution profile) and an HFP (hands-free profile). The core protocol includes but is not limited to a Bluetooth basic service discovery protocol (service discovery protocol, SDP), a logical link control and adaptation protocol (logical link control and adaptation protocol, L2CAP), and the like. The core protocol is essential to the Bluetooth stack.

The HCI provides an upper-layer protocol with a unified interface for entering a link manager and a unified manner for entering a baseband. There are several transport layers between the host core protocol stack and the controller. These transport layers are transparent and complete a task of transmitting data. The Bluetooth special interest group (Bluetooth Special Interest Group, SIG) defines four physical bus modes to connect to hardware, that is, four HCI transport layers: USB, RS232, UART, and PC card.

The controller defines a bottom-layer hardware part, including a radio frequency (RF), a baseband (BB), and a link manager (LM). An RF layer filters and transmits data bit streams by using microwaves on a 2.4 GHz unlicensed ISM band, and mainly defines conditions that a Bluetooth transceiver needs to meet to work properly on this frequency band. The baseband is responsible for frequency hopping and transmission of Bluetooth data and information frames. The link manager is responsible for connection, establishment, and disconnection of links, and security control. An LM (Link Manager) layer is a link management layer protocol of the Bluetooth stack, and is responsible for translating an upper-layer HCI command into an operation acceptable to the baseband, and establishing an asynchronous connection-oriented link (asynchronous connection-oriented link, ACL), a synchronous connection-oriented/extended (asynchronous connection-oriented/extended, SCO) link, and a working mode for enabling a second electronic device to enter an energy saving mode. An LC (Link Control) layer is responsible for responding to an upper-layer LM command during transmission of a batch of data packets (for example, executing LM commands for establishing a transmission link of a data packet and maintaining the link).

In this embodiment of this application, the Bluetooth stack (BT Stack) may further include a technical parameter control module, and the controller may further include a technical parameter controller. The technical parameter control module may deliver a connection parameter of a link to the technical parameter controller based on one or more of a data codec format of the third electronic device 300 and device class information of the second electronic device 200. The connection parameter includes, for example, a connection interval. The technical parameter controller may carry the connection parameter in a parameter request and send the parameter request to the third electronic device 300, so as to notify the third electronic device 300 to perform data exchange based on the connection parameter. Some content that is of the method described in this embodiment of this application and that is implemented by the wireless communications module 160 of the first electronic device 100 shown in FIG. 2A may be specifically performed by a Bluetooth module or a Bluetooth chip.

Figure 3:
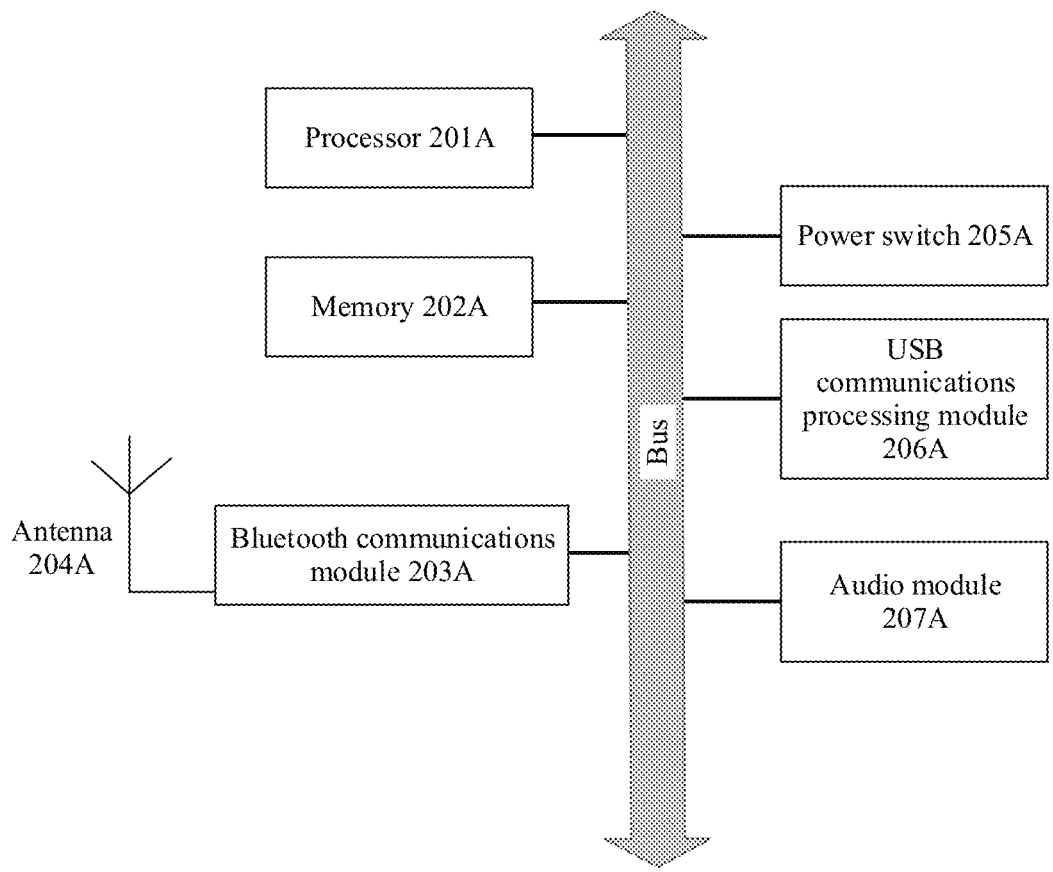
FIG. 3 is a schematic diagram of a structure of a second electronic device 200 according to an embodiment of this application.

FIG. 3 shows an example of a schematic diagram of a structure of the second electronic device 200 according to an embodiment of this application.

The following uses the second electronic device 200 as an example to describe the embodiment in detail. It should be understood that the second electronic device 200 shown in FIG. 3 is merely an example, and the second electronic device 200 may have more or fewer components than those shown in FIG. 3, or two or more components may be combined, or different component configurations may be used. Various components shown in the figure may be implemented by using hardware including one or more signal processing and/or application-specific integrated circuits, software, or a combination of hardware and software.

As shown in FIG. 3, the second electronic device 200 may include: a processor 201A, a memory 202A, a Bluetooth communications module 203A, an antenna 204A, a power switch 205A, a USB communications processing module 206A, and an audio module 207A.

The processor 201A may be configured to read and execute computer-readable instructions. During specific implementation, the processor 201A may mainly include a controller, a calculator, and a register. The controller is mainly responsible for decoding an instruction, and sends a control signal for an operation corresponding to the instruction. The calculator is mainly responsible for storing a register operand, an intermediate operation result, and the like that are temporarily stored during instruction execution. During specific implementation, a hardware architecture of the processor 201A may be an application-specific integrated circuit (ASIC) architecture, an MIPS architecture, an ARM architecture, an NP architecture, or the like.

In some embodiments, the processor 201A may be configured to parse a signal, for example, a pairing mode modification request sent by the first electronic device 100, received by the Bluetooth communications module 203A. The processor 201A may be configured to perform a corresponding processing operation based on a parsing result, for example, generate a pairing mode modification response.

The memory 202A is coupled to the processor 201A, and is configured to store various software programs and/or a plurality of sets of instructions. During specific implementation, the memory 202A may include a high-speed random access memory, and may also include a nonvolatile memory such as one or more disk storage devices, a flash device, or another nonvolatile solid-state storage device. The memory 202A may store an operating system, for example, an embedded operating system such as uCOS, VxWorks, or RTLinux. The memory 202A may further store a communications program. The communications program may be used to communicate with the first electronic device 100, one or more servers, or another device.

The Bluetooth communications module 203A may include a classic Bluetooth (BR/EDR) module and a Bluetooth low energy (BLE) module.

In some embodiments, the Bluetooth communications module 203A may listen to a signal, such as a detection request or a scanning signal, transmitted by another device (for example, the first electronic device 100); and may send a response signal, a scanning response, or the like, to enable the another device (for example, the first electronic device 100) to discover the second electronic device 200; establish a wireless communications connection to the another device (for example, the first electronic device 100); and communicate with the another device (for example, the first electronic device 100) through Bluetooth.

In some other embodiments, the Bluetooth communications module 203A may also transmit a signal, for example, broadcast a BLE signal, to enable another device (for example, the first electronic device 100) to discover the second electronic device 200; establish a wireless communications connection to the another device (for example, the first electronic device 100); and communicate with the another device (for example, the first electronic device 100) through Bluetooth.

A wireless communications function of the second electronic device 200 may be implemented through the antenna 204A, the Bluetooth communications module 203A, the modem processor, and the like.

The antenna 204A may be configured to transmit and receive electromagnetic wave signals. Each antenna in the second electronic device 200 may be configured to cover one or more communications bands.

In some embodiments, the Bluetooth communications module 203A may have one or more antennas.

The power switch 205A may be configured to control a power supply to supply power to the second electronic device 200.

The USB communications processing module 206A may be configured to communicate with another device through a USB interface (not shown).

The audio module 207A may be configured to output an audio signal through an audio output interface, so that the second electronic device 200 can support audio playback. The audio module may be further configured to receive audio data through an audio input interface. The second electronic device 200 may be a media playback device, for example, a Bluetooth headset.

In some embodiments, the second electronic device 200 may further include a display (not shown). The display may be configured to display an image, prompt information, and the like. The display may be a liquid crystal display (liquid crystal display, LCD), an organic light-emitting diode (organic light-emitting diode, OLED) display, an active-matrix organic light-emitting diode (active-matrix organic light-emitting diode, AMOLED) display, a flexible light-emitting diode (flexible light-emitting diode, FLED) display, a quantum dot light emitting diode (quantum dot emitting diode, QLED) display, or the like.

In some embodiments, the second electronic device 200 may further include a serial interface such as an RS-232 interface. The serial interface may be connected to another device, for example, an audio loudspeaker device such as a sound box, so that the second electronic device 200 and the audio loudspeaker device cooperatively play audio and videos.

It may be understood that the structure shown in FIG. 3 does not constitute a specific limitation on the second electronic device 200. In some other embodiments of this application, the second electronic device 200 may include more or fewer components than those shown in the figure, or combine some components, or split some components, or have different component arrangements. The components shown in the figure may be implemented by using hardware, software, or a combination of software and hardware.

In the method provided in this embodiment of this application, for a Bluetooth protocol framework used by the second electronic device 200, refer to FIG. 2B. Details are not described herein again.

In this embodiment of this application, for a schematic diagram of a structure of the third electronic device 300, refer to the description of the schematic diagram of the structure of the second electronic device 200 shown in FIG. 3. Details are not described herein again.

The following describes a principle of connecting the first electronic device 100 to a plurality of Bluetooth devices. An example in which the first electronic device 100 establishes Bluetooth connections to the second electronic device 200 and the third electronic device 300 is used for description.

The first electronic device 100 may separately establish Bluetooth connections to the second electronic device 200 and the third electronic device 300 based on a same Bluetooth protocol or different Bluetooth protocols. For ease of description, a concept of a connection event (Connection Event) is introduced in this application.

In some embodiments of this application, for example, a connection event A may refer to an action of transmitting data between the first electronic device 100 and the second electronic device 200, and a connection event B may refer to an action of transmitting data between the first electronic device 100 and the third electronic device 300. In some embodiments, the connection event A may be an action of transmitting audio data between the first electronic device 100 and the second electronic device 200, and the connection event B may be an action of transmitting voice data between the first electronic device 100 and the second electronic device 200.

In some other embodiments of this application, the connection event may alternatively be a time unit used for exchanging data. The connection event may occur periodically at a fixed time interval (that is, a connection interval). Each connection event corresponds to a physical channel (PHY channel). In each connection event, the first electronic device 100 and the second electronic device 200 select a physical channel corresponding to the connection event to exchange data.

For details, refer to FIG. 4A to FIG. 4D. FIG. 4A to FIG. 4D are schematic diagrams of a time sequence of data transmission through a Bluetooth connection according to an embodiment of this application. Descriptions are provided in the following two cases: (1) A plurality of Bluetooth devices all establish Bluetooth low energy (Bluetooth Low Energy, BLE) connections. (2) A plurality of Bluetooth devices establish both a BLE connection and a BR/EDR connection.

(1) A Plurality of Bluetooth Devices all Establish BLE Connections.

After the first electronic device 100 separately establishes the BLE connections to the second electronic device 200 and the third electronic device 300, the first electronic device 100 may separately exchange data with the second electronic device 200 and the third electronic device 300 in different connection events.

Figure 4A:
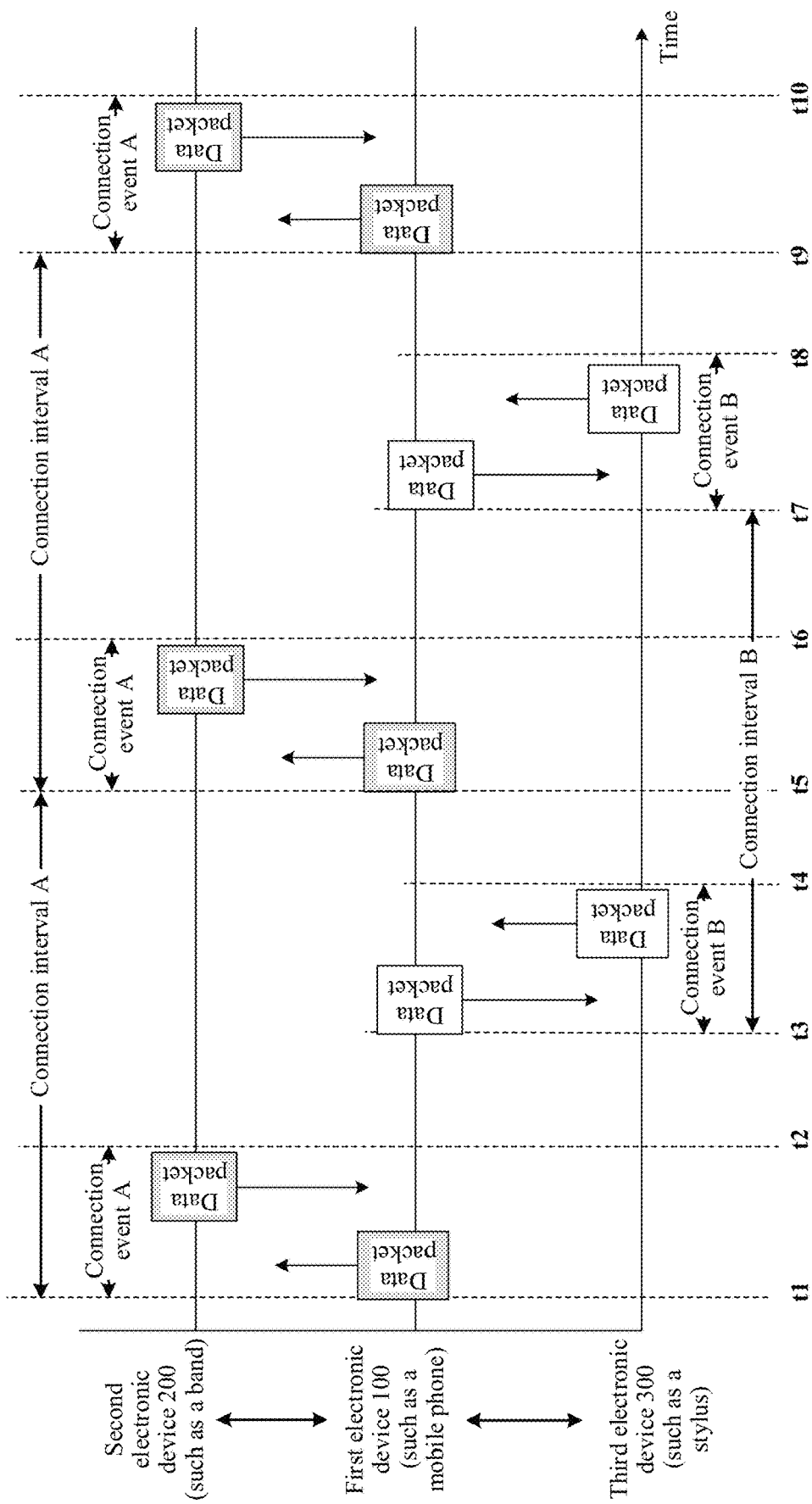
FIG. 4A to FIG. 4D are schematic diagrams of a time sequence of data transmission through a Bluetooth connection according to an embodiment of this application.

As shown in FIG. 4A, a connection event A is a connection event between the first electronic device 100 and the second electronic device 200, and the connection event A may include at least one time period: t1 to t2, t5 to t6, and t9 to t10. The first electronic device 100 and the second electronic device 200 may exchange data in the connection event A. Specifically, the first electronic device 100 may send a data packet to the second electronic device 200 at start moments t1, t5, and t9 of the connection event A. The second electronic device 200 may send a data packet (for example, may be an ACK) to the first electronic device 100 after receiving the data packet. The second electronic device 200 may alternatively ignore, based on a slave latency of the second electronic device 200, the data packet sent by the first electronic device 100. In other words, the second electronic device 200 does not respond after receiving the data packet sent by the first electronic device 100. In addition, a quantity of times that the first electronic device 100 exchanges data with the second electronic device 200 in a connection interval A is not limited in this embodiment of this application. The connection event A may occur periodically at a fixed time interval (that is, the connection interval A).

A connection event B may be considered as a connection event between the first electronic device 100 and the third electronic device 300, and the connection event B may include at least one time period: t3 to t4, and t7 to t8. The first electronic device 100 and the third electronic device 300 exchange data in the connection event B. Specifically, the first electronic device 100 may send a data packet to the third electronic device 300 at start moments t3 and t7 of the connection event B. The third electronic device 300 may send a data packet to the first electronic device 100 after receiving the data packet. The third electronic device 300 may alternatively ignore, based on a slave latency of the third electronic device 300, the data packet sent by the first electronic device 100. In other words, the third electronic device 300 does not respond after receiving the data packet sent by the first electronic device 100. In addition, a quantity of times that the first electronic device 100 exchanges data with the third electronic device 300 in a connection interval B is not limited in this embodiment of this application.

In this embodiment of this application, the connection event A of the second electronic device 200 and the connection interval B of the third electronic device 300 may not overlap, that is, the moment t3 is later than the moment t2, and the moment t7 is later than the moment t6.

As shown in FIG. 4A, the connection event A occurs at the fixed time interval (that is, the connection interval A). The connection interval A of the second electronic device 200 may include at least one time period: t1 to t5 and t5 to t9. The connection event B also occurs at the fixed time interval (that is, the connection interval B). The connection interval B of the third electronic device 300 may include a time period t3 to t7. The connection interval A may be equal to or not equal to the connection interval B. This is not limited in this embodiment of this application. In this embodiment of this application, the connection interval A and the connection interval B may be in a unit of 1.25 ms, and a range of the connection interval A and the connection interval B may be between 7.5 ms and 4 s.

In this embodiment of this application, the first electronic device 100 may be a mobile phone, the second electronic device 200 may be a band, and the third electronic device 300 may be a stylus. The mobile phone may store device class information and a priority corresponding to the device class information. In a scenario, the mobile phone may first establish a Bluetooth connection to the band, and exchange data based on the connection event A and the connection interval A in FIG. 4A. Further, while the mobile phone is connected to the band, when the mobile phone establishes a Bluetooth connection to the stylus, the mobile phone may increase or not adjust the connection interval A of the band based on one or more of Bluetooth profiles supported by the stylus and the band or the device class information. To be specific, when a priority of device class information of the band is lower than or the same as a priority of device class information of the stylus, the mobile phone increases or does not adjust the connection interval A of the band.

It may be understood that, when the band establishes a BLE Bluetooth connection to the mobile phone, the mobile phone may obtain the device class information of the band. Further, the mobile phone may compare the device class information of the band with the prestored device class information, and obtain the priority corresponding to the device class information of the band. When the mobile phone is connected to the stylus, an action of adjusting a connection interval of the band is triggered.

Figure 4B:
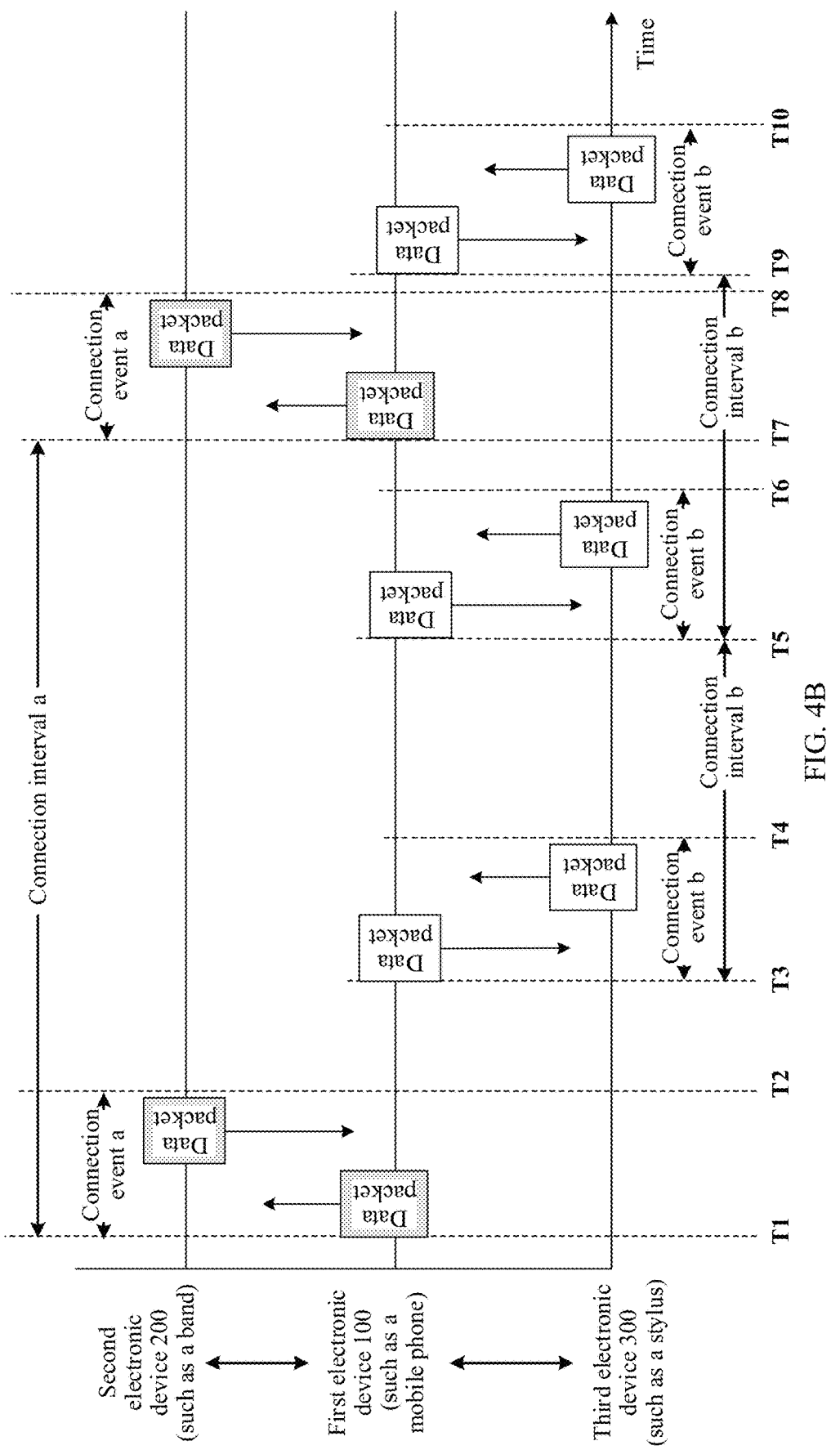

In another scenario, the mobile phone may establish a Bluetooth connection to the band, and the mobile phone and the band exchange data based on the connection event A and the connection interval A in FIG. 4A. The mobile phone may further establish a Bluetooth connection to the stylus, and the mobile phone and the stylus exchange data based on the connection event B and the connection interval B in FIG. 4A. When the data exchanged between the mobile phone and the stylus is a control signal (for example, a control signal for starting a camera application), the mobile phone may adjust the connection interval A of the band to a connection interval a. The connection interval a is greater than the connection interval A. The mobile phone may further adjust the connection interval B of the stylus to a connection interval b. The connection interval b is smaller than the connection interval B. As shown in FIG. 4B, after connection intervals of the band and the stylus are adjusted, a connection event a of the band may include at least one time period: T1 to T2 and T7 to T8, and the connection interval a of the band may include a time period T1 to T7. A connection event b of the stylus may include at least one time period: T3 to T4, T5 to T6, and T9 to T10, and the connection interval b of the stylus may include at least one time period: T3 to T5 and T5 to T9. After the adjustment, the connection interval of the band is increased and the connection interval of the stylus is reduced.

It can be learned that when the connection interval of the band is increased, time for which a connection event of the band occupies a channel of the mobile phone is reduced. Therefore, time reserved for another Bluetooth device (for example, the stylus) to exchange data with the mobile phone is increased, thereby improving a throughput speed of exchanging data between the stylus and the mobile phone.

(2) A Plurality of Bluetooth Devices Establish Both a BLE Connection and a BR/EDR Connection.

The first electronic device 100 may establish a BLE connection to the second electronic device 200, and the first electronic device 100 may further establish a BR/EDR connection to the third electronic device 300.

Figure 4C:
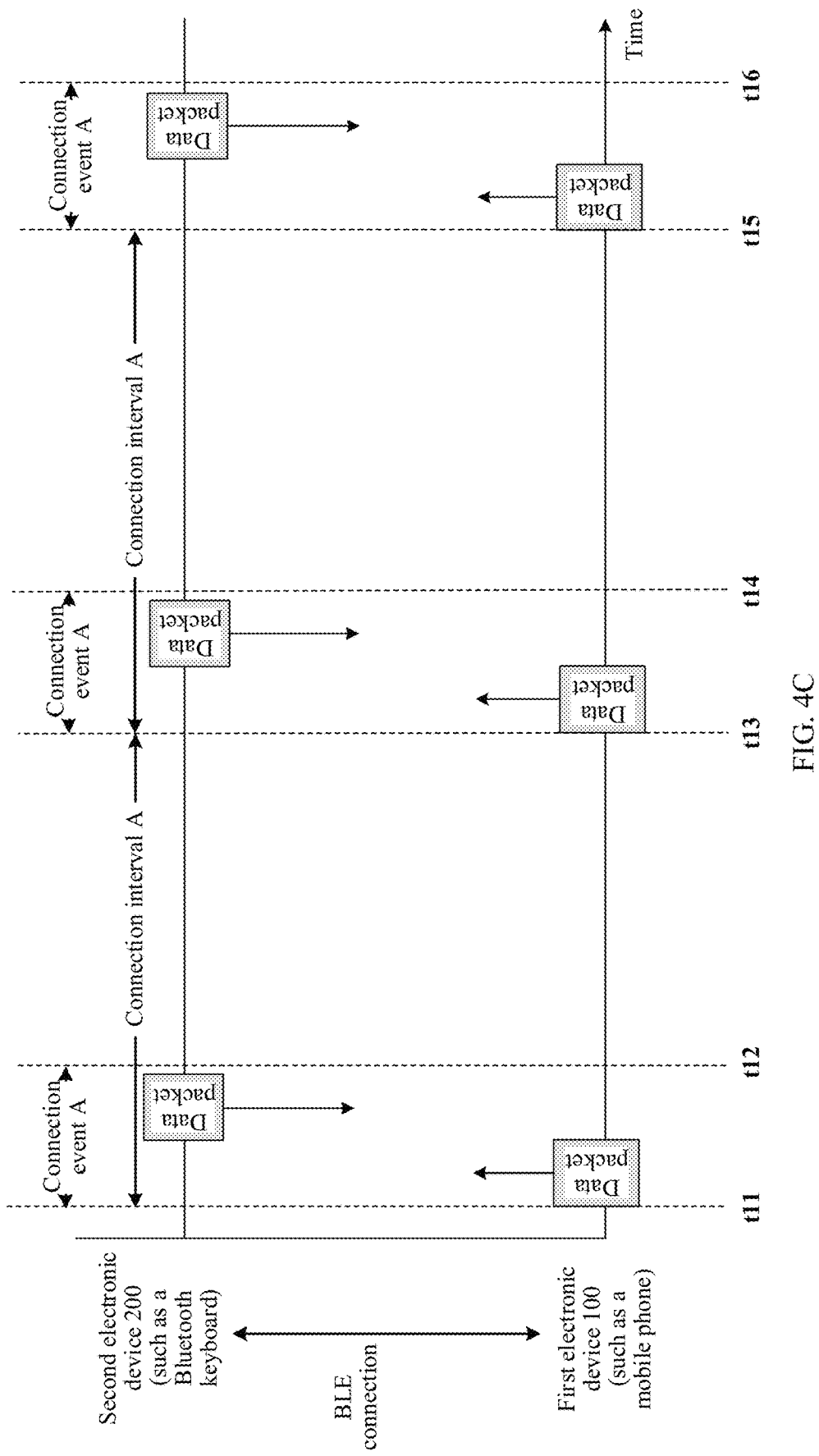

As shown in FIG. 4C, the first electronic device 100 and the second electronic device 200 may exchange data in the connection event A. The connection event A may include at least one time period: t11 to t12, t15 to t16, and t9 to t20. The first electronic device 100 may send a data packet to the second electronic device 200 at start moments t11, t15, and t19 of the connection event A. The second electronic device 200 may send a data packet to the first electronic device 100 after receiving the data packet. The second electronic device 200 may alternatively ignore, based on the slave latency of the second electronic device 200, the data packet sent by the first electronic device 100. In other words, the second electronic device 200 does not respond after receiving the data packet sent by the first electronic device 100. Time periods t12 to t13 and t14 to t15 may be used by another Bluetooth device to exchange data with the first electronic device 100 when the another Bluetooth device accesses the first electronic device 100.

Figure 4D:
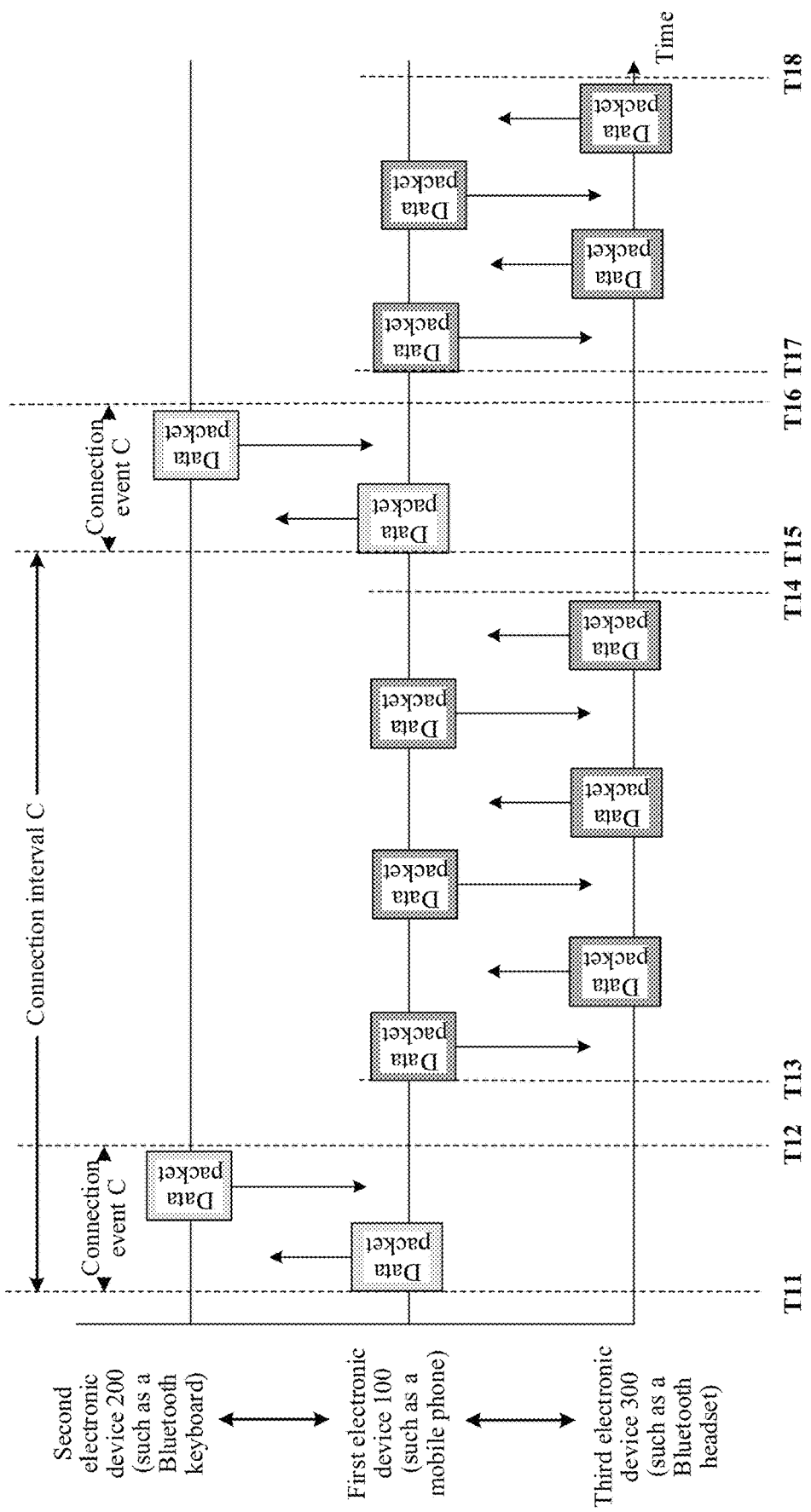

In this embodiment of this application, the first electronic device 100 may be a mobile phone, the second electronic device 200 may be a Bluetooth keyboard, and the third electronic device 300 may be a Bluetooth headset. In a scenario, the mobile phone may store device class information and a priority corresponding to the device class information. The mobile phone may first establish a Bluetooth connection to the Bluetooth keyboard, and exchange data based on the connection event A and the connection interval A in FIG. 4C. While the mobile phone maintains the Bluetooth connection to the Bluetooth keyboard, when the mobile phone establishes a Bluetooth connection to the Bluetooth headset, the mobile phone may increase the connection interval A of the Bluetooth keyboard based on device class information of the Bluetooth keyboard when establishing a BR/EDR connection to the Bluetooth headset. As shown in FIG. 4D, the mobile phone may adjust the connection interval A of the Bluetooth keyboard to a connection interval C. The connection interval C is greater than the connection interval A. As shown in FIG. 4D, after a connection interval of the Bluetooth keyboard is adjusted, a connection event C of the Bluetooth keyboard may include a time period T11 to T12, and the connection interval C of the Bluetooth keyboard may include a time period T11 to T15. The mobile phone may exchange data with the Bluetooth headset in time periods T13 to T14 and T17 to T18.

It may be understood that, when the Bluetooth keyboard establishes a BLE connection to the mobile phone, the mobile phone may obtain the device class information of the Bluetooth keyboard. Further, the mobile phone may compare the device class information of the Bluetooth keyboard with the prestored device class information, and obtain a priority corresponding to the device class information of the Bluetooth keyboard. When the mobile phone is connected to the Bluetooth headset, an action of adjusting the connection interval of the Bluetooth keyboard is triggered.

In this embodiment of this application, a Huawei mobile phone may prestore device class information and a corresponding priority of a device produced by Huawei Technologies Co., Ltd. When the Huawei mobile phone establishes a BLE connection to a Huawei band, the Huawei mobile phone may detect that device class information of the Huawei band is included in prestored device class information. The Huawei mobile phone may further determine a priority of the device class information of the Huawei band based on a priority of the prestored device class information. When a headset is connected to the Huawei mobile phone, the Huawei mobile phone may trigger an action of adjusting a connection interval of the Huawei Band.

In this embodiment of this application, that the device class information of the Bluetooth device is the same as the device class information prestored in the mobile phone means that the device class information prestored in the mobile phone includes the device class information of the Bluetooth device.

It can be learned that when the connection interval of the Bluetooth keyboard is increased, time for which the connection event C of the Bluetooth keyboard occupies the channel of the mobile phone is reduced. Therefore, time reserved for another Bluetooth device (for example, the Bluetooth headset) to exchange data with the mobile phone is increased, thereby improving a throughput speed of exchanging data between the Bluetooth headset and the mobile phone. When the data exchanged between the Bluetooth headset and the mobile phone is audio data, for example, in a music listening scenario, real-time performance of audio data transmission is improved.

In another scenario, the mobile phone may establish a Bluetooth connection to the Bluetooth keyboard, and the mobile phone and the Bluetooth keyboard exchange data based on the connection event C and the connection interval C in FIG. 4D. The mobile phone may further establish a Bluetooth connection to the Bluetooth headset, and the mobile phone and the Bluetooth headset exchange data in time periods T13 to T14 and T17 to T18 in FIG. 4C. When the data exchanged between the mobile phone and the Bluetooth headset is audio data, or a codec format of the Bluetooth headset includes one or more of LDAC, HWA, aptX HD, and AAC, the mobile phone may increase the connection interval C of the Bluetooth keyboard.

In this embodiment of this application, the first electronic device 100 is not limited to storing device class information. The first electronic device 100 may further store one or more of the device class information and the Bluetooth profile, and a corresponding priority. For one or more of the device class information and the Bluetooth profile, and the corresponding priority, refer to descriptions in the embodiment described in FIG. 9. Details are not described herein again.

In this embodiment of this application, after a Bluetooth device (the second electronic device 200 and the third electronic device 300) establishes a Bluetooth connection to the first electronic device 100, a connection parameter of the Bluetooth device is determined, that is, a time sequence of data transmission between the first electronic device 100 and the Bluetooth device is determined.

Data exchanged between the first electronic device 100 and the second electronic device 200 may be heartbeat data, and data exchanged between the first electronic device 100 and the third electronic device 300 may be audio data. According to the time sequence of data transmission between the first electronic device 100 and the Bluetooth device, the connection event A of the second electronic device 200, that is, the time period t11 to t12, may overlap with the time period t13 to t14 for exchanging data of the third electronic device 300. For example, in a time sequence described in FIG. 4C, the moment t13 is before the moment t12. The first electronic device 100 may select one Bluetooth device from the second electronic device 200 and the third electronic device 300 based on data transmitted by the two Bluetooth devices, and preferentially transmit data of the Bluetooth device.

Figure 5:
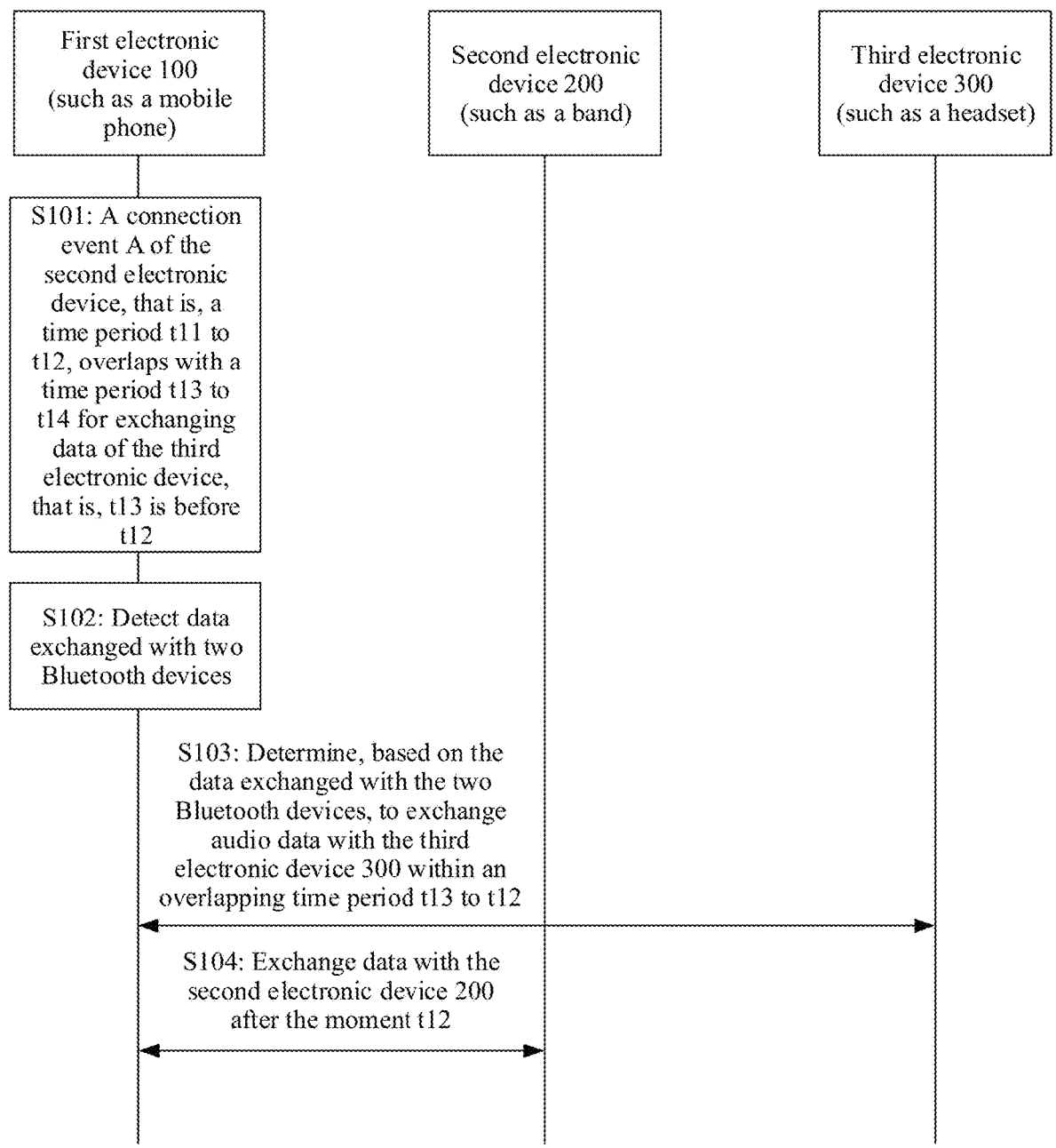
FIG. 5 is a schematic flowchart of a Bluetooth connection method according to an embodiment of this application.

FIG. 5 is a schematic flowchart of a Bluetooth connection method according to an embodiment of this application. The method includes steps S101 to S104.

S101: The first electronic device 100 detects that a connection event A of a second electronic device, that is, a time period t11 to t12, overlaps with a time period t13 to t14 for exchanging data of a third electronic device, that is, t13 is before t12.

For example, the first electronic device 100 detects, based on connection parameters of respective links of two Bluetooth devices, that time for the two Bluetooth devices to exchange data with the first electronic device 100 overlaps.

S102: The first electronic device 100 detects the data exchanged with the two Bluetooth devices.

In some embodiments, the first electronic device 100 detects that data exchanged with the second electronic device 200 is heartbeat data, sleep data, or a control signal, and data exchanged with the third electronic device 300 is audio data. Because the audio data has a high real-time requirement, the first electronic device 100 may exchange data with the third electronic device 300 within an overlapping time period t9 to t6.

S103: The first electronic device 100 determines, based on the data exchanged with the two Bluetooth devices, to exchange the audio data with the third electronic device 300 within an overlapping time period t13 to t12.

S104: The first electronic device 100 exchanges data with the second electronic device 200 after the moment t12.

When the time for the two Bluetooth devices to exchange data with the first electronic device 100 overlaps, the first electronic device 100 may select one Bluetooth device from the second electronic device 200 and the third electronic device 300 based on data transmitted by the Bluetooth devices, and preferentially transmit data of the Bluetooth device. Because the audio data has a high real-time requirement, the first electronic device 100 preferentially transmits the audio data, so that a throughput speed of audio data transmission can be improved.

To improve a data throughput speed of a Bluetooth connection, this embodiment of this application provides a Bluetooth connection method. In the method, the first electronic device 100 may store device class information and a corresponding priority. The second electronic device 200 has established a BLE connection to the first electronic device 100. When the third electronic device 300 establishes a Bluetooth connection to the first electronic device 100, the first electronic device 100 may adjust a connection parameter of the second electronic device 200 based on device class information of the second electronic device 200. For example, the first electronic device 100 increases a connection interval between the first electronic device 100 and the second electronic device 200.

In this way, time for which a connection event of the second electronic device 200 occupies a channel of the first electronic device may be reduced, and time for exchanging data between the third electronic device 300 and the first electronic device 100 may be increased, thereby improving a throughput speed of exchanging data between the third electronic device 300 and the first electronic device 100.

For example, after the first electronic device 100 establishes a Bluetooth connection to the second electronic device 200, a connection interval A between the first electronic device 100 and the second electronic device 200 is 10 ms. The first electronic device 100 establishes a Bluetooth connection to the third electronic device 300, and the device class information of the second electronic device is included in device class information stored in the first electronic device 100. In this case, the first electronic device 100 may adjust the connection interval A between the first electronic device 100 and the second electronic device 200 to 18 ms.

In this embodiment of this application, an example in which the first electronic device 100 stores device class information and a corresponding priority is used for description, but is not limited to the device class information. The first electronic device 100 may further store one or more of the device class information and a Bluetooth profile, and the corresponding priority. In this case, the second electronic device 200 has established a BLE connection to the first electronic device 100. When the third electronic device 300 establishes a Bluetooth connection to the first electronic device 100, the first electronic device 100 may adjust a connection parameter of the second electronic device 200 based on one or more of the device class information of the second electronic device 200 and the Bluetooth profile.

In some other embodiments of this application, the second electronic device 200 has established a BLE connection to the first electronic device 100. When the third electronic device 300 establishes a Bluetooth connection to the first electronic device 100, the first electronic device 100 may adjust the connection parameter of the second electronic device 200 based on one or more of data (for example, audio data) exchanged with the third electronic device 300 and the device class information of the second electronic device 200.

In another possible embodiment, an example in which a Bluetooth profile of the third electronic device 300 includes at least one of an A2DP and an HFP is used for description. It may be understood that, not limited to the A2DP and the HFP, when the Bluetooth profile of the third electronic device 300 includes another audio-related Bluetooth profile, or a Bluetooth profile corresponding to a data service having a relatively high real-time requirement, the first electronic device 100 may also adjust the connection interval between the first electronic device 100 and the second electronic devices 200.

In some embodiments, a user may customize priorities of different Bluetooth devices connected to the electronic device 100 or the priorities of different Bluetooth devices connected to the electronic device 100 may be set by default in a system. For example, the first electronic device 100 may define different priorities based on one or more of a Bluetooth profile supported by the Bluetooth device and device class information of the Bluetooth device. The first electronic device 100 establishes BLE connections to a plurality of Bluetooth devices. When the first electronic device 100 establishes a BR/EDR connection to the third electronic device 300, the first electronic device 100 may increase a connection interval of a connected Bluetooth device with a lower priority based on one or more of the stored Bluetooth profile and device class information, and the corresponding priority. Therefore, time for exchanging data between the third electronic device 300 having a higher priority and the first electronic device 100 is increased, and a throughput speed of exchanging data between the third electronic device 300 and the first electronic device 100 is improved. For a description of the priority, refer to the description of step S203 in the Bluetooth connection method described in FIG. 9.

The following describes a schematic diagram of user interfaces of a Bluetooth connection method involved in an embodiment of this application.

The following describes a schematic diagram of user interfaces after the first electronic device 100 establishes a Bluetooth connection to the second electronic device 200. FIG. 6A to FIG. 6E are schematic diagrams of some user interfaces according to an embodiment of this application.

Figure 6A:
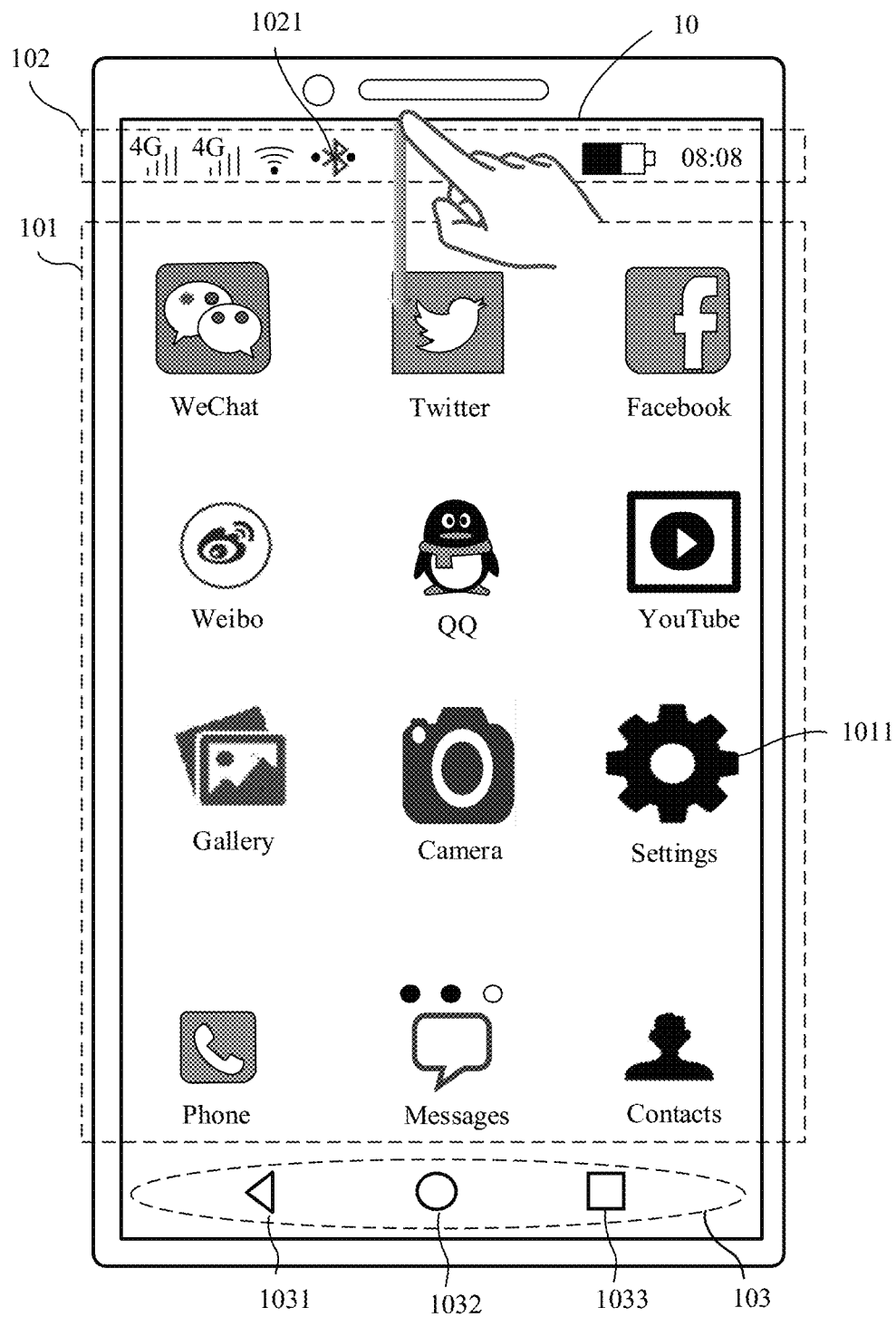
FIG. 6A to FIG. 6E are schematic diagrams of some user interfaces according to an embodiment of this application.

As shown in FIG. 6A, the first electronic device 100 may display a home screen interface 10. The interface 10 includes an application icon 101, a status bar 102, and a navigation bar 103.

The application icon 101 may include, for example, a WeChat (WeChat) icon, a Twitter (Twitter) icon, a Facebook (Facebook) icon, a Weibo (Sina Weibo) icon, a QQ (Tencent QQ) icon, a YouTube (YouTube) icon, a Gallery (Gallery) icon, a Camera (camera) icon, and a Settings icon 1011, and may further include an icon of another application. This is not limited in this embodiment of this application. An icon of any application may be used to respond to a user operation, for example, a touch operation, so that the first electronic device 100 starts the application corresponding to the icon.

The status bar 102 may include a name of a carrier (for example, China Mobile), time, a Wi-Fi icon, signal strength, and a current battery level. The status bar 102 may further include a Bluetooth icon 1021.

The navigation bar 103 may include system navigation buttons such as a back button 1031, a home screen (home screen) button 1032, and a historical call-out task button 1033. The home screen interface 10 is an interface displayed by the first electronic device 100 after a user operation performed on the home screen button 1032 is detected on any user interface. When detecting that a user taps the back button 1031, the first electronic device 100 may display a previous user interface of a current user interface. When detecting that the user taps the home screen button 1052, the first electronic device 100 may display the home screen interface 10. When detecting that the user taps the historical call-out task button 1033, the first electronic device 100 may display a task recently enabled by the user. The navigation buttons may have other names. For example, 1031 may be referred to as a Back button, 1032 may be referred to as a Home button, and 1033 may be referred to as a Menu button. This is not limited in this application. The navigation buttons in the navigation bar 103 are not limited to virtual buttons, and may also be implemented as physical buttons.

Figure 6B:
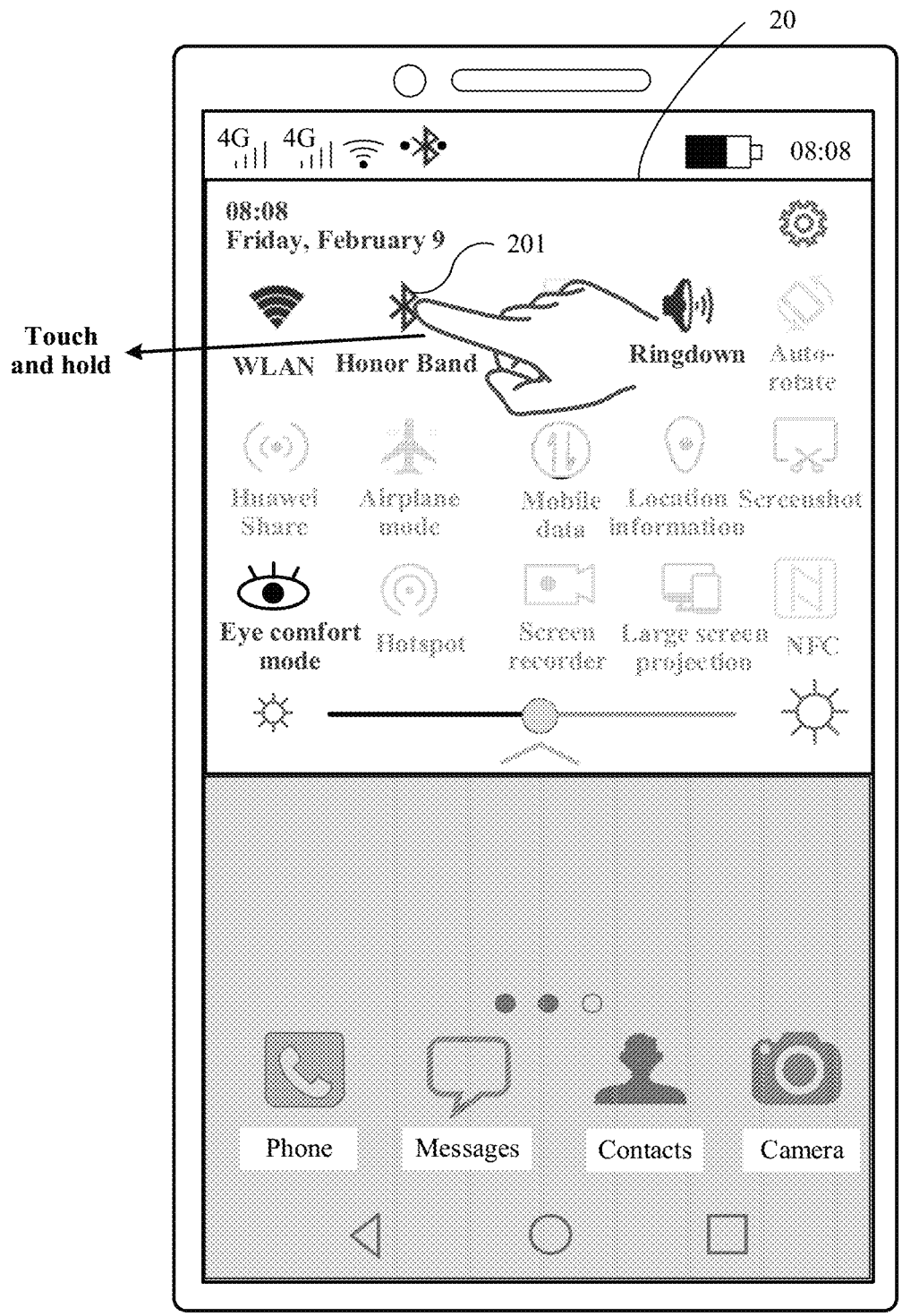

The first electronic device 100 may receive a sliding operation (for example, sliding down from a position of the status bar 102) performed on the status bar 102, and in response to the sliding operation performed on the status bar 102, the first electronic device 100 may display a window menu 20 shown in FIG. 6B.

As shown in FIG. 6B, the window menu 20 may include some function on/off controls (for example, a WLAN on/off control, a Bluetooth switch 201, a flashlight on/off control, a reminder type switching control, an auto-rotate on/off control, a Huawei Share on/off control, an airplane mode on/off control, a mobile data on/off control, a location on/off control, a screenshot on/off control, an eye comfort mode on/off control, a hotspot on/off control, a screen recorder on/off control, a large-screen projection control, and an NFC on/off control). After establishing a Bluetooth connection to the second electronic device 200, the first electronic device 100 may prompt, on the Bluetooth switch 201 in the window menu 20, a device name of a connected Bluetooth device, that is, a device name (for example, "Honor Band") of the second electronic device 200.

As shown in FIG. 6B, the Bluetooth switch 201 is in an on state, indicating that a Bluetooth function is enabled.

After the Bluetooth function is enabled, the first electronic device 100 may search for Bluetooth advertisements (including a BLE advertisement and a classic Bluetooth advertisement) of other devices in the background, and record a found advertisement. In response to a user operation performed on the Bluetooth switch 201, the first electronic device 100 disables the Bluetooth function, and the Bluetooth switch 201 may be switched to an off state, to notify the user that the Bluetooth function is currently disabled.

Figure 6C:
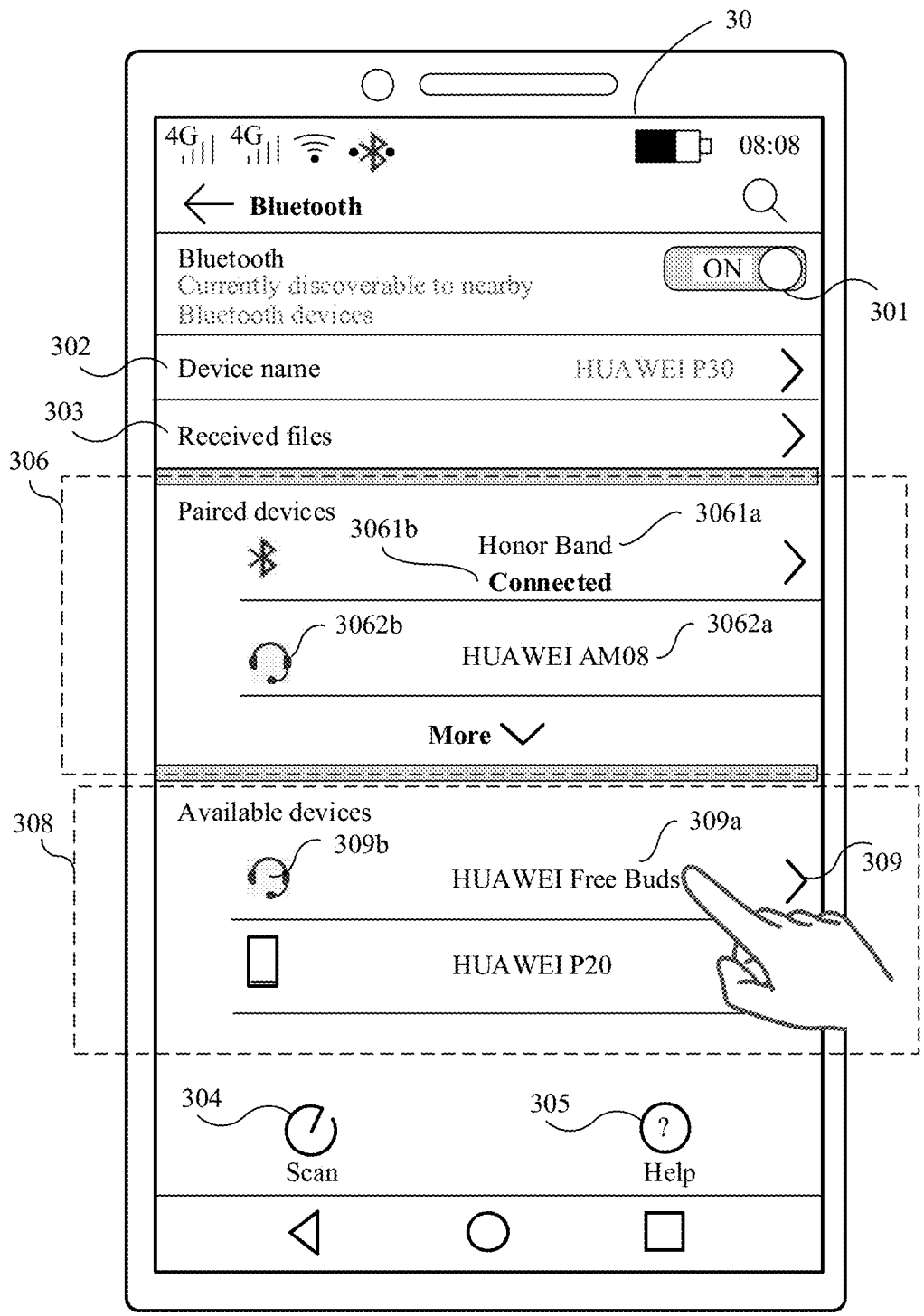

As shown in FIG. 6B and FIG. 6C, in response to a touch and hold operation performed on the Bluetooth switch 201, the first electronic device 100 may display a Bluetooth setting interface 30. As shown in FIG. 6C, the Bluetooth setting interface 30 includes a Bluetooth switch 301, a device name entry 302, a received file entry 303, a scanning control 304, a help control 305, and a paired device list 306. The Bluetooth switch 301 may be configured to receive a user operation (for example, a tap operation), and trigger the first electronic device 100 to enable/disable a Bluetooth function.

For example, the Bluetooth switch 301 is currently in an on state, and the first electronic device 100 may receive the user operation (for example, the tap operation) performed on the Bluetooth switch 301, and in response to the user operation performed on the Bluetooth switch 301, the first electronic device 100 may disable the Bluetooth function.

The paired device list 306 may include one or more paired device options, for example, an "Honor Band" device option and a "HUAWEI AM08" device option. The "Honor Band" device option includes a device name 3061a and a connection status 3061b. The device name 3061a indicates the "Honor Band", and the connection status 3061b indicates "Connected", which is used to indicate that the device is currently connected to the first electronic device 100.

The "HUAWEI AM08" device option includes a device name 3062a and a device class indicator 3061b. The device name 3062a indicates "HUAWEI AM08", and the device class 3062b indicates that the device class is a headset. The first electronic device 100 may display the device option of the paired Bluetooth device in the paired device list 306.

Each search performed by the first electronic device 100 may be limited to a period of time (for example, 5 seconds), that is, the first electronic device stops searching after enabling the Bluetooth function and starting searching for 5 seconds. After the first electronic device 100 stops searching, the first electronic device 100 may receive a user operation (for example, a tap operation) performed on the scanning control 304, and in response to the user operation performed on the scanning control 304, the first electronic device 100 may search for a Bluetooth advertisement of another device again.

When the first electronic device 100 stops searching, the first electronic device 100 may further display an available device list 308 on the Bluetooth setting interface 30. The available device list 308 includes a device option corresponding to a Bluetooth advertisement received by the first electronic device 100. When the first electronic device 100 does not stop searching, the first electronic device 100 may further display a scanning prompt on the Bluetooth setting interface 30, to prompt that the first electronic device 100 is currently scanning for an available device.

In this embodiment of this application, a device name of the third electronic device 300 may be "HUAWEI Free Buds". After a Bluetooth function is enabled, the third electronic device 300 may send a BLE advertisement. The BLE advertisement includes a device address, a device name, a device class, and the like of the third electronic device 300.

When the first electronic device 100 detects the BLE advertisement of the third electronic device 300 through scanning, the first electronic device 100 may display a device option of the third electronic device 300 in the available device list 308 based on the BLE advertisement.

For example, as shown in FIG. 6C, the first electronic device 100 stops searching for a Bluetooth advertisement. The first electronic device 100 may display a device option 309 of the third electronic device 300 in the available device list 308. The device option 309 of the third electronic device 300 includes a device name 309a and a device class 309b of the third electronic device. The device name 309a indicates "HUAWEI Free Buds", and the device class 309b indicates a headset.

The first electronic device 100 may receive a user operation (for example, a tap operation) performed on the device option 309, and in response to the user operation performed on the device option 309, the first electronic device 100 may perform a Bluetooth pairing procedure and a Bluetooth connection procedure with the third electronic device 300.

Figure 6D:
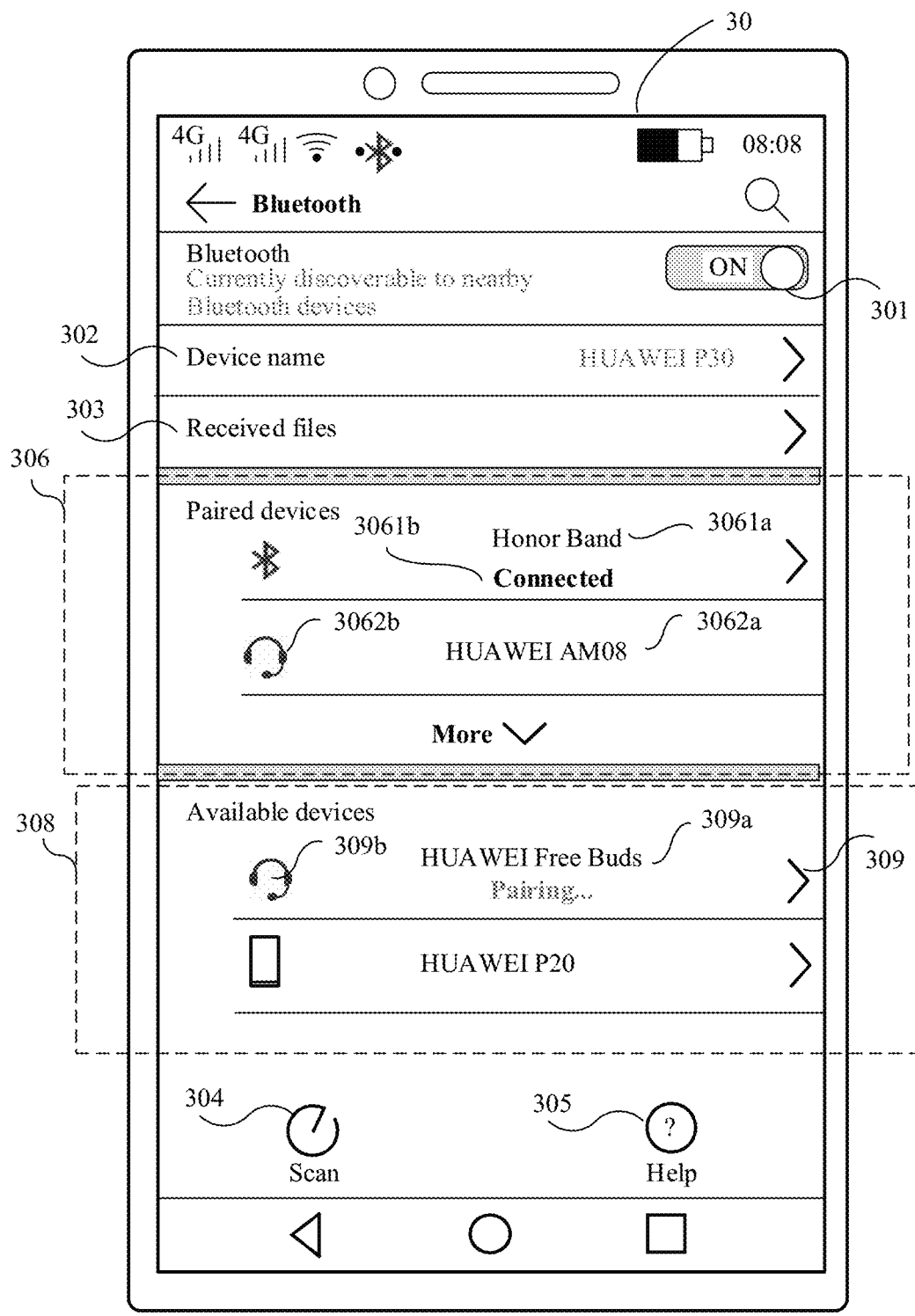

The following describes user interfaces involved in the Bluetooth pairing procedure and the Bluetooth connection procedure. As shown in FIG. 6D, after receiving the user operation performed on the device option 309, the first electronic device 100 may output a prompt indicating that Bluetooth pairing is being performed (for example, display a word such as "pairing . . . " in the device option 309) before Bluetooth pairing is completed.

Figure 6E:
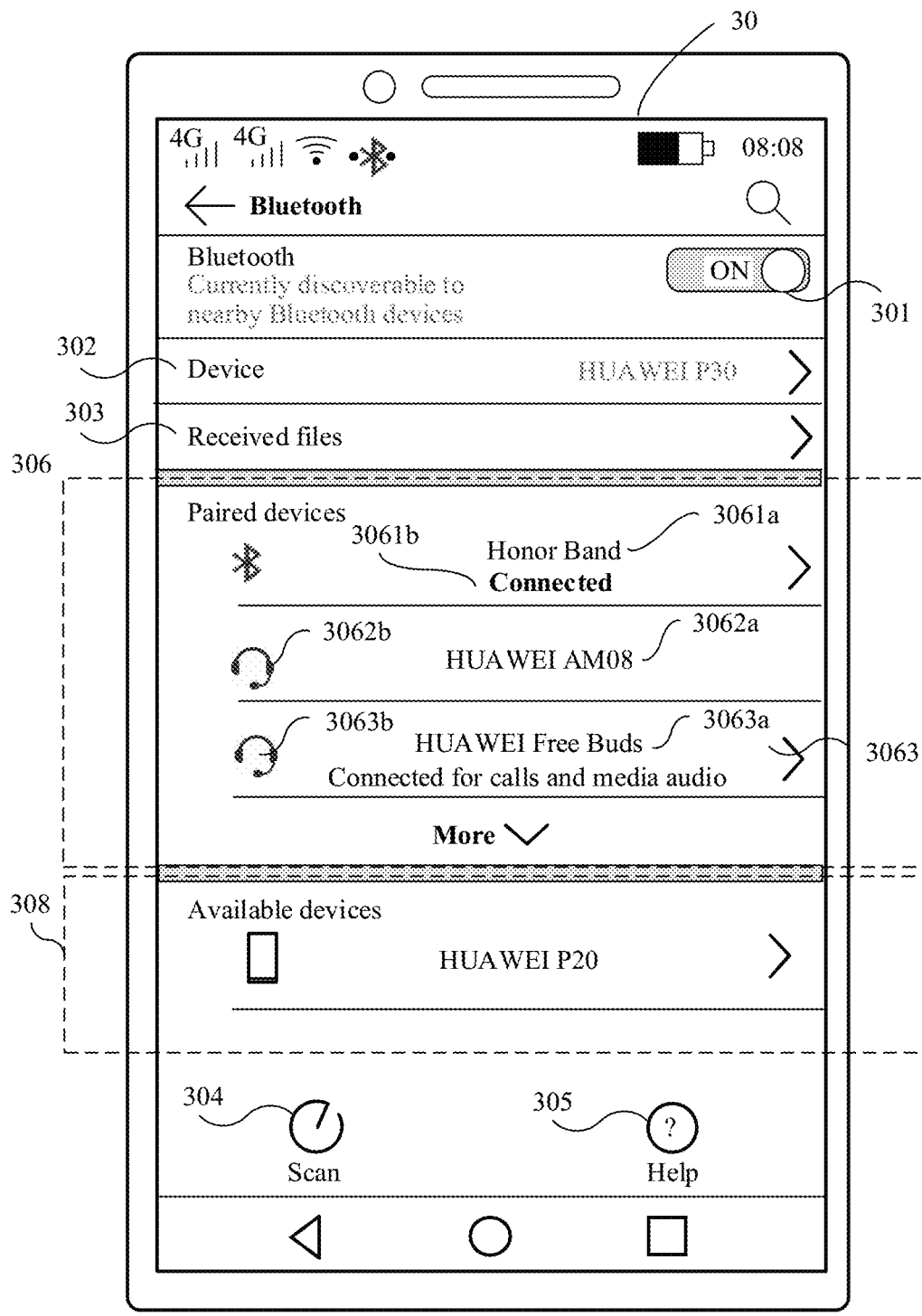

As shown in FIG. 6E, after the first electronic device 100 is successfully paired with the third electronic device 300, the first electronic device 100 may display a device option 3063 of the third electronic device 300 in the paired device list 306, including a device name 3063a and a device class 3063b. The device name 3063a indicates "HUAWEI Free Buds", and the device class 3063b indicates that the device class is a headset.

After the first electronic device 100 is successfully paired with the third electronic device 300, the first electronic device 100 may establish a Bluetooth connection to the third electronic device 300.

After the first electronic device 100 establishes the Bluetooth connection to the third electronic device 300, the first electronic device 100 may display connected prompt information on the device option 3063, to prompt the user that the first electronic device 100 has established the Bluetooth connection to the third electronic device 300. For example, as shown in FIG. 6E, the connected prompt information displayed by the first electronic device 100 on the device option 3063 may be text information "Connected for calls and media audio", or the like.

The Bluetooth connection established between the first electronic device 100 and the third electronic device 300 may be triggered and executed by the user. For example, after the first electronic device 100 is successfully paired with Bluetooth, the first electronic device 100 may display a verification code interface. In response to the user operation, when a verification code is successfully verified, the electronic device 100 may establish a classic Bluetooth connection to the third electronic device 300.

Figure 7A:
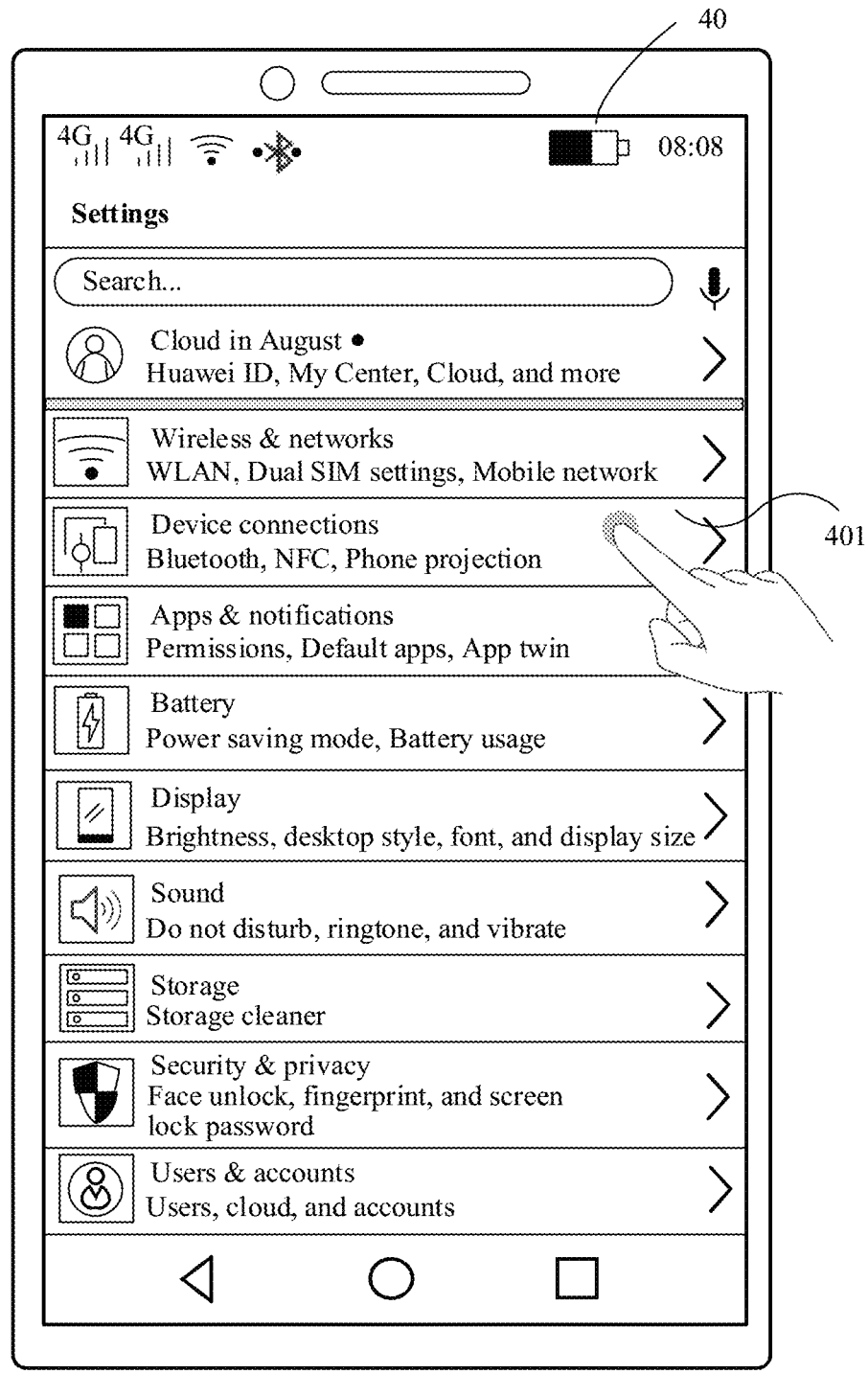
FIG. 7A and FIG. 7B are schematic diagrams of some user interfaces according to an embodiment of this application.
Figure 7B:
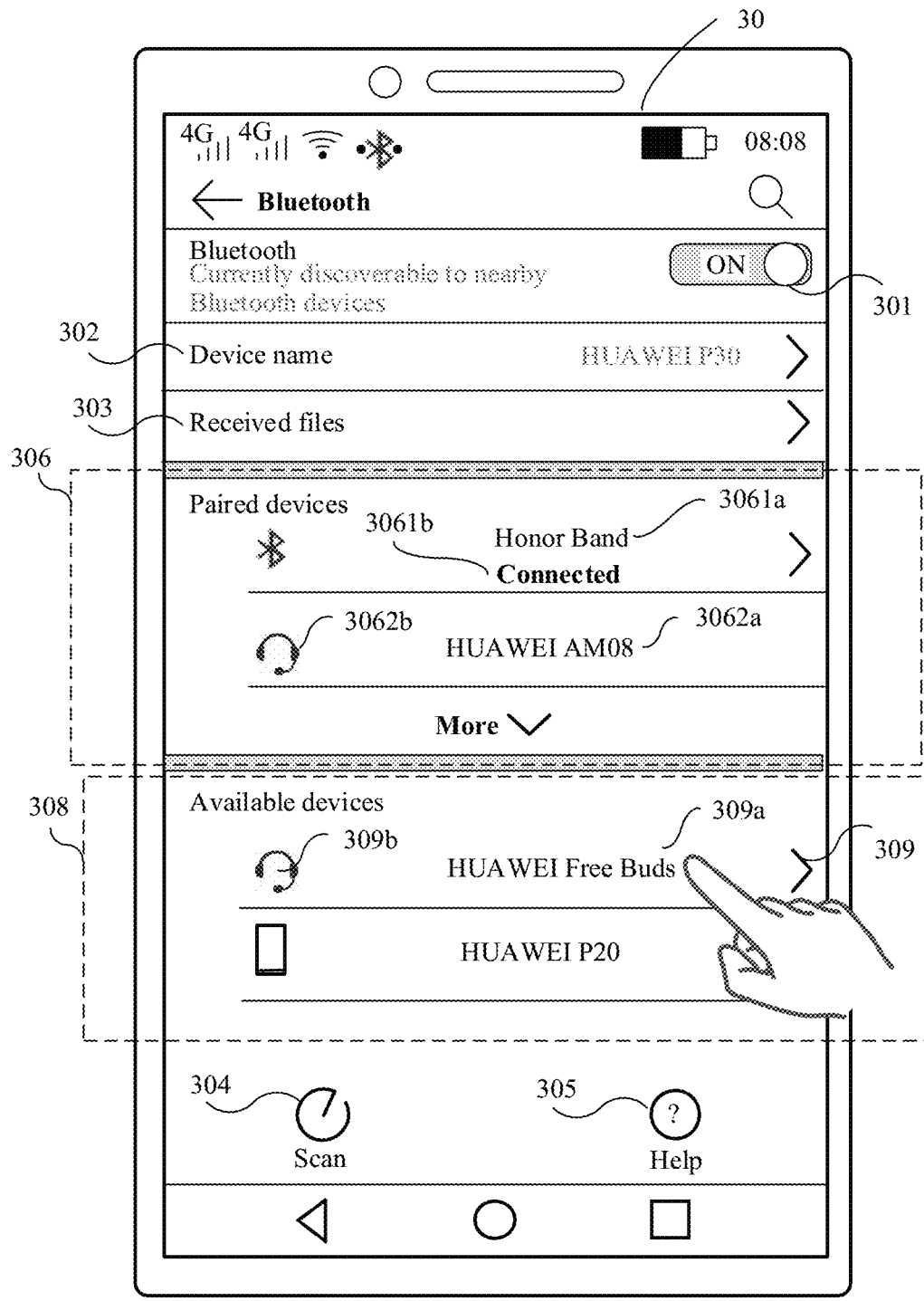

In this embodiment of this application, the Bluetooth setting interface 30 is not limited to being enabled on the window menu 20 in response to a user operation, or may be enabled on a settings interface 40 in response to a user operation. FIG. 7A and FIG. 7B are schematic diagrams of some user interfaces according to an embodiment of this application.

As shown in FIG. 7A, the first electronic device 100 may receive a user operation (for example, a tap operation) performed on the Settings icon 1011, and in response to the user operation performed on the Settings icon 1011, the first electronic device 100 may display the setting interface 40 shown in FIG. 7A.

As shown in FIG. 7A, the setting interface 40 includes a plurality of setting entries: a wireless and network entry, a device connection entry 401, an application and notification entry, a battery entry, a display entry, a sound entry, a storage entry, a security and privacy entry, a user and account entry, and the like.

The first electronic device 100 may receive a user operation (for example, a tap operation) performed on the device connection entry 401, and in response to the user operation performed on the device connection entry 401, the first electronic device 100 may display a Bluetooth setting interface 30 shown in FIG. 7B, which may refer to the Bluetooth setting interface 30 described in FIG. 6C.

In this embodiment of this application, when the third electronic device 300 establishes a Bluetooth connection to the first electronic device 100, the first electronic device 100 may increase a connection interval of the second electronic device 200 based on device class information of the second electronic device 200.

In some other embodiments of this application, when audio data on the first electronic device 100 needs to be transmitted to the third electronic device 300 for playing, the first electronic device 100 may adjust a connection parameter of a Bluetooth connection to the second electronic device 200. The following describes a related user interface.

Figure 8A:
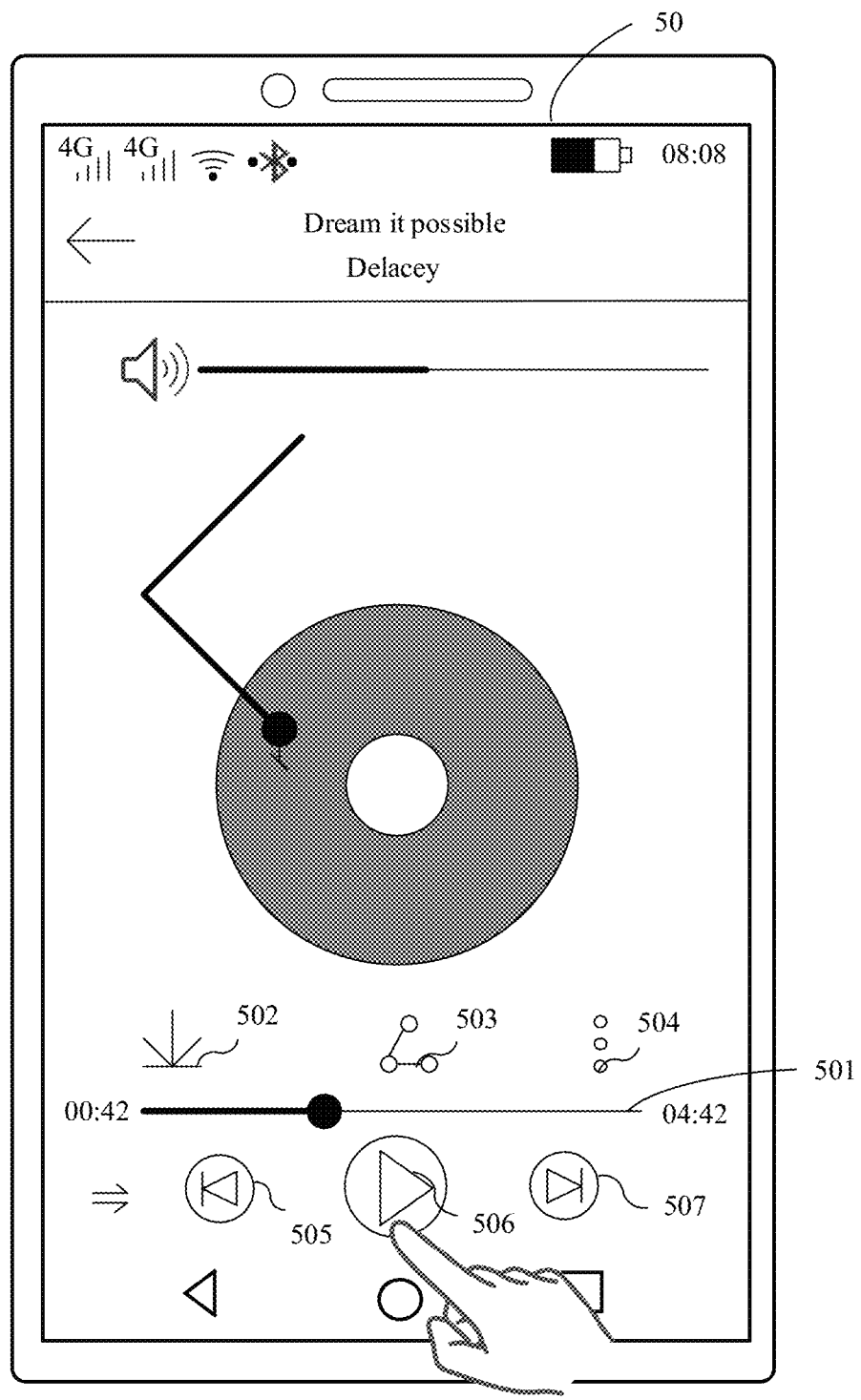
FIG. 8A to FIG. 8D are schematic diagrams of some user interfaces according to an embodiment of this application.

FIG. 8A to FIG. 8D are schematic diagrams of some user interfaces according to an embodiment of this application. After the first electronic device 100 establishes the Bluetooth connection to the third electronic device 300, the first electronic device 100 may play an audio file in response to a user operation. As shown in FIG. 8A, the first electronic device 100 may display an audio playback interface 50. The audio playback interface 50 may include a progress bar control 501, a download control 502, a share control 503, a more control 504, a control 505 for switching to a previous audio file, a play control 506, and a control 507 for switching to a previous audio file.

The play control 506 is configured to play or pause playing a current audio file. The current audio file is, for example, an audio file named "Dream it possible" shown in FIG. 8A. As shown in FIG. 8A, the play control 506 is in a paused state, which indicates that playing of the current audio file is paused. In response to a user operation performed on the play control 506, the first electronic device 100 may start, by default, transmitting audio data of the current audio file to the third electronic device 300 that is connected through Bluetooth, and play the audio file by using the third electronic device 300. The first electronic device 100 may detect that the data exchanged with the third electronic device 300 is audio data. The play control 506 switches from the paused state to a play state.

When the first electronic device 100 detects that the data transmitted to the third electronic device 300 is audio data (for example, PCM data), the first electronic device 100 adjusts the connection parameter of the Bluetooth connection to the second electronic device 200 based on a class of the data exchanged with the third electronic device 300. For example, when the class of the data exchanged with the third electronic device 300 is audio data, the first electronic device 100 increases the connection interval between the first electronic device 100 and the second electronic device 200.

Figure 8B:
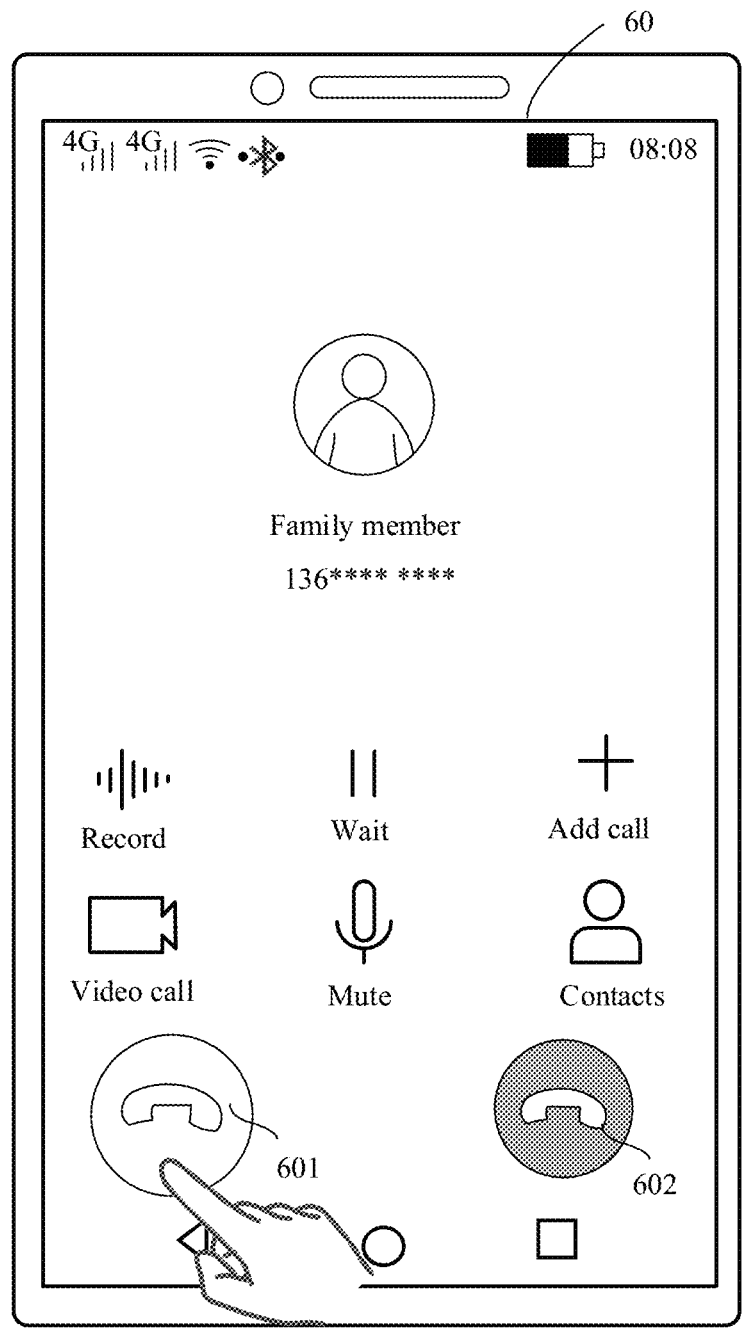

In another possible embodiment, as shown in FIG. 8B, for example, another person may page, by using a number of a SIM card through a terminal, a number of a SIM card installed in the first electronic device 100. When receiving an incoming call, the first electronic device 100 may display an incoming call interface 60. As shown in FIG. 8B, the incoming call interface 60 may include an incoming call number, a record control, a wait control, an add call control, a video call control, a mute control, a contacts control, an answer control 601, and a decline control 602.

In response to a user operation performed on the answer control 601, for example, a touch operation, the first electronic device 100 may connect a call channel between a peer end (a terminal corresponding to the incoming call number) and the first electronic device 100. The first electronic device 100 may transmit, through a Bluetooth connection, audio data from the peer end to the third electronic device 300 that is connected through Bluetooth, and play the audio data by using the third electronic device 300. The first electronic device 100 may detect that the data exchanged with the third electronic device 300 is audio data. When the first electronic device 100 detects that the data transmitted to the third electronic device 300 is audio data, the first electronic device 100 adjusts the connection parameter of the Bluetooth connection to the second electronic device 200 based on a class of the data exchanged with the third electronic device 300. For example, when the class of the exchanged data is audio data, the first electronic device 100 increases the connection interval between the first electronic device 100 and the second electronic device 200.

In another possible embodiment, the first electronic device 100 is in a ringing mode. When the first electronic device 100 receives an incoming call paging, the first electronic device 100 may invoke system audio data (corresponding to an incoming call ringtone) and transmit the system audio data to the third electronic device 300 through a Bluetooth connection, and the third electronic device 300 plays the audio data. The first electronic device 100 may detect that the data exchanged with the third electronic device 300 is audio data.

Figure 8C:
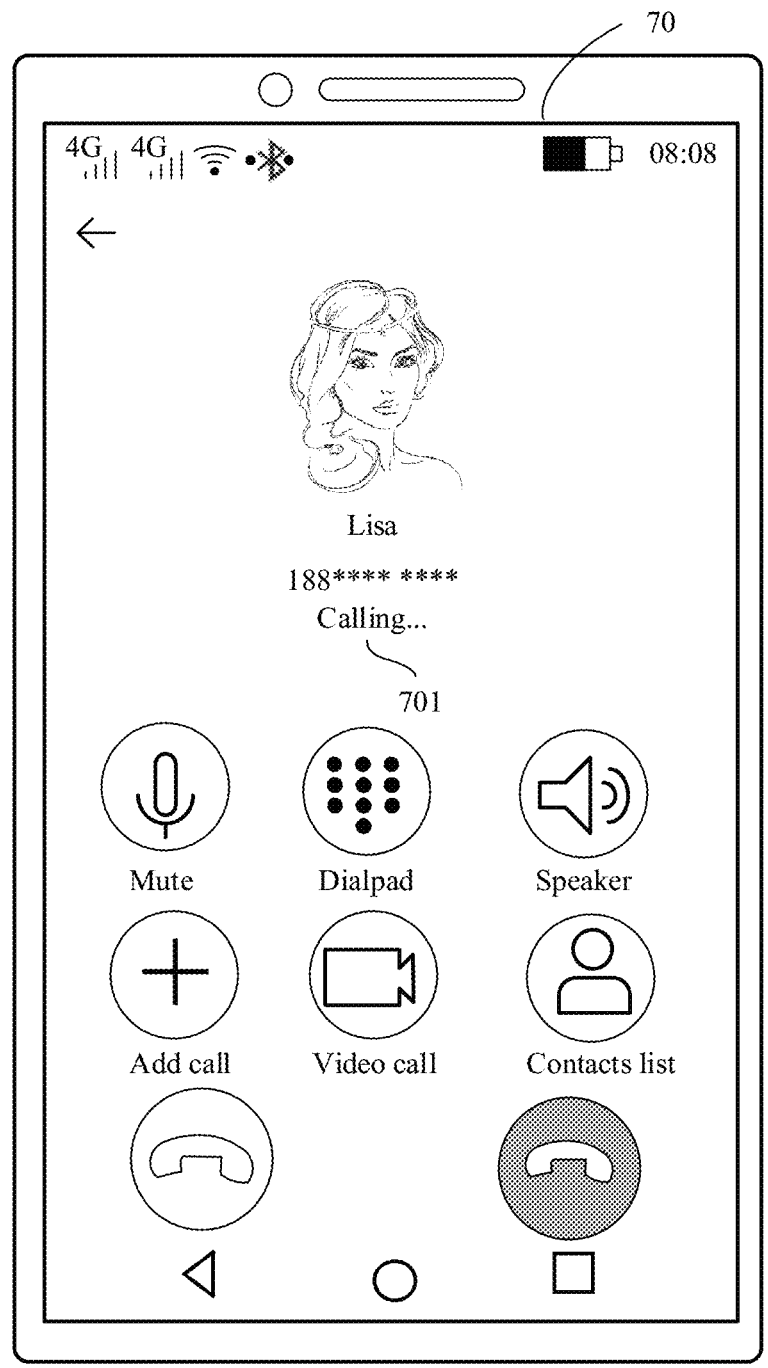

This is not limited to an interface for answering an incoming call shown in FIG. 8B. The first electronic device 100 may actively make a call. When the peer end answers the call channel, the first electronic device 100 may also transmit, through a Bluetooth connection, audio data from the peer end to the third electronic device 300 that is connected through Bluetooth, and play the audio data by using the third electronic device 300. The first electronic device 100 may detect that the data exchanged with the third electronic device 300 is audio data. As shown in FIG. 8C, a call interface 70 is shown. The call interface 70 may include a call prompt 701, a mute control, a dial control, a hands-free control, an add call control, a video call control, an address book control, an answer control, and a decline control. The first electronic device 100 may initiate a paging to a peer end corresponding to a phone number, and invoke a system ringtone prompt tone to send the system ringtone prompt tone to the third electronic device 300 for playing. The first electronic device 100 may detect that the data exchanged with the third electronic device 300 is audio data. When the peer end answers the call channel, the first electronic device 100 may also transmit, through a Bluetooth connection, audio data from the peer end to the third electronic device 300, and the data exchanged between the first electronic device 100 and the third electronic device 300 is audio data.

Figure 8D:
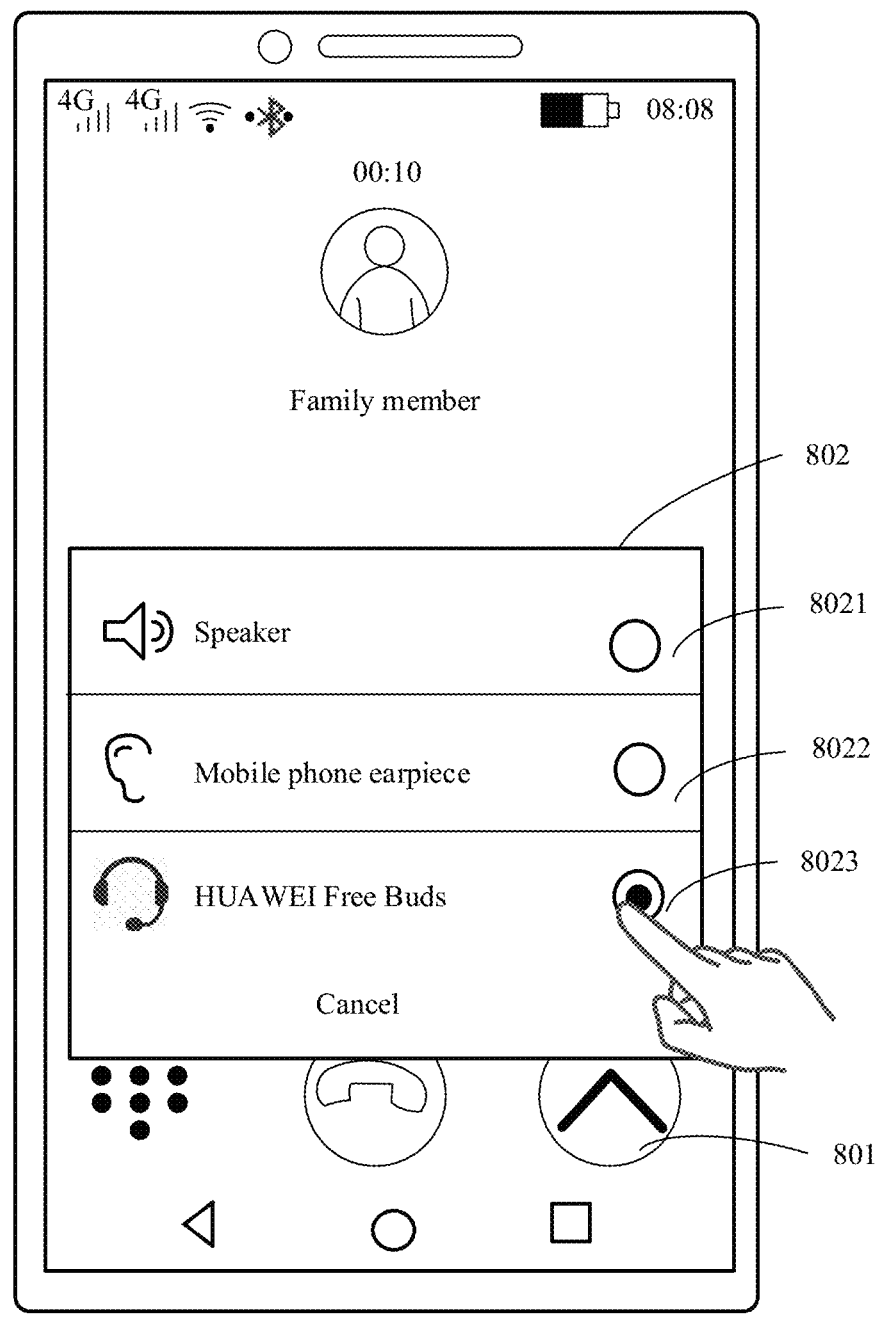

After the call channel is connected, the first electronic device 100 may play the audio data by using an earpiece of the mobile phone. As shown in FIG. 8D, a user interface displayed on the first electronic device 100 may include a control 801, configured to switch an apparatus for playing audio data. The first electronic device 100 may display an audio switching interface 80 in response to a user operation performed on the control 801. The audio playback switching interface 80 may include a speaker option 802, a mobile phone earpiece option 8022, and a Bluetooth headset option 8023. In response to a user operation performed on the Bluetooth headset option 8023, the first electronic device 100 may play audio by using a headset connected through Bluetooth.

In this embodiment of this application, a call interface is not limited to the call interfaces shown in FIG. 8B, FIG. 8C, and FIG. 8D, and may alternatively be another call interface, for example, a WeChat voice call interface or a WeChat video call interface or a paging interface. An application in which the call interface is located is not limited in this embodiment of this application. This is not limited to the call interface. Alternatively, on a video playback interface, if the first electronic device 100 detects a user operation performed on a control used to play audio and videos, the first electronic device 100 transmits audio data corresponding to the video to the third electronic device 300 through the Bluetooth connection. The first electronic device 100 may exchange audio data with the third electronic device 300.

Figure 9:
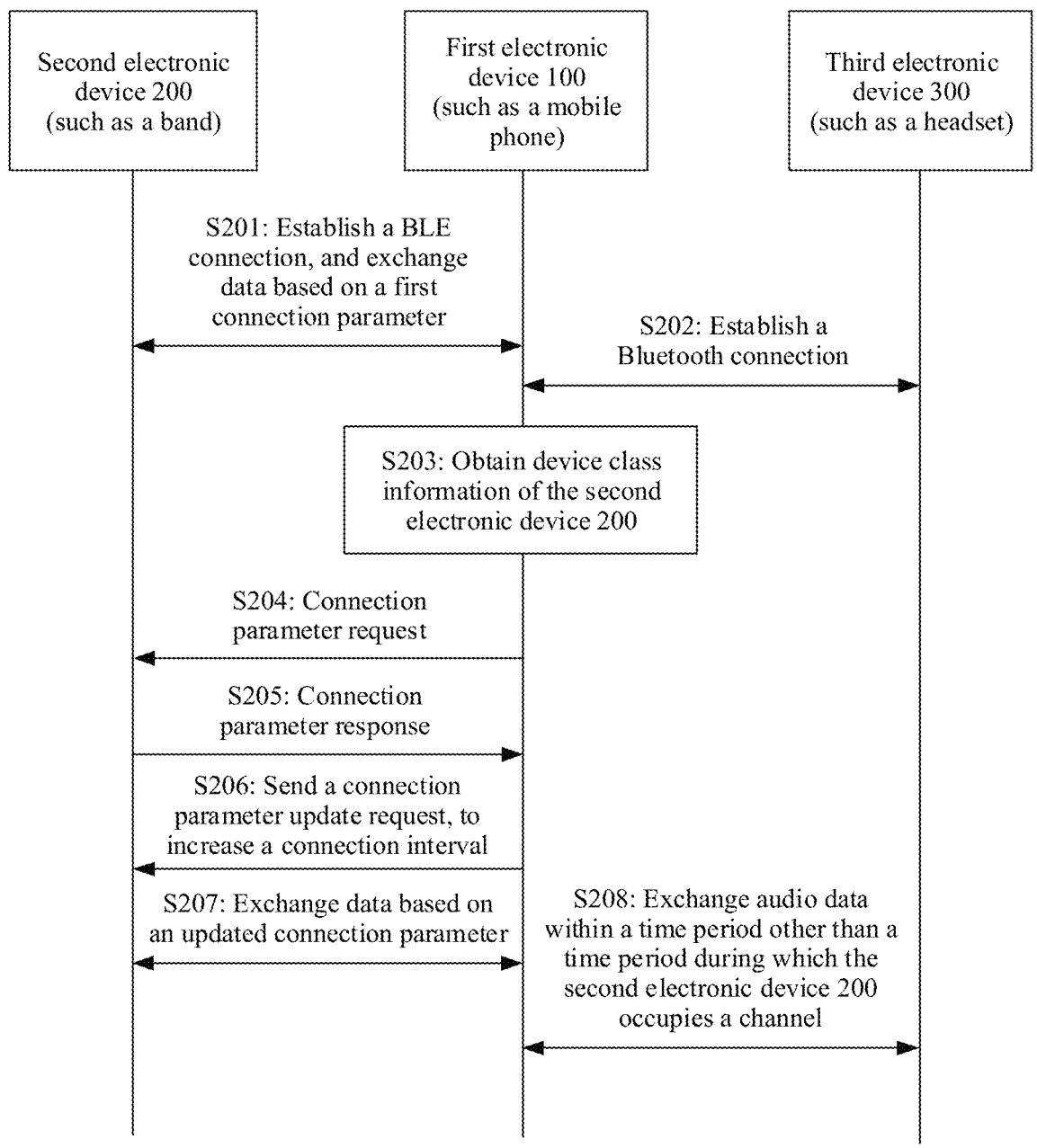
FIG. 9 is a schematic flowchart of a Bluetooth connection method according to an embodiment of this application.

The following specifically describes a Bluetooth connection method provided in this application. In the Bluetooth connection method, the first electronic device 100 may store device class information and a corresponding priority. The second electronic device 200 has established a BLE connection to the first electronic device 100. When detecting that a headset (the third electronic device 300) is connected through Bluetooth, the first electronic device 100 (for example, a mobile phone) may increase a connection interval of the second electronic device 200 based on device class information of the second electronic device 200. FIG. 9 is a schematic flowchart of a Bluetooth connection method according to an embodiment of this application. As shown in FIG. 9, the method includes steps S201 to S208.

S201: The first electronic device 100 establishes a BLE connection to the second electronic device 200, and exchanges data based on a first connection parameter.

A connection parameter may include: a connection interval (Connection Interval), a slave latency (Slave Latency), and a supervision timeout (Supervision Timeout). The slave latency is a quantity of times of connection events ignored by a Bluetooth device. The Bluetooth device may skip these ignored connection events, and does not need to reply to a packet of a host in these connection events, so as to save power consumption. For the supervision timeout, if an electronic device and the Bluetooth device do not exchange data within the supervision timeout, BLE between the electronic device and the Bluetooth device is disconnected. The first connection parameter may include a first connection interval, a first latency, and a first supervision timeout. The first connection interval, the first latency, and the first supervision timeout may meet: the first supervision timeout>(1+the first latency)×the first connection interval×2.

S202: The first electronic device 100 establishes a Bluetooth connection to the third electronic device 300.

In this embodiment of this application, the first electronic device 100 may establish a BR/EDR connection to the third electronic device 300, which may be used to transmit audio data.

For a user interface involved when the third electronic device 300 accesses the first electronic device 100 through Bluetooth, refer to related descriptions of FIG. 6B to FIG. 6E and FIG. 7A and FIG. 7B. Not limited to FIG. 6B to FIG. 6E and FIG. 7A and FIG. 7B, the third electronic device 300 may further have been paired with the first electronic device 100, and when a Bluetooth module of the third electronic device 300 is powered on and the third electronic device 300 is within a searchable range of the first electronic device 100, the third electronic device 300 may access the first electronic device 100 through Bluetooth.

S203: The third electronic device 300 performs Bluetooth access, and the first electronic device 100 obtains device class information of the second electronic device 200.

In this embodiment of this application, the first electronic device 100 may prestore a plurality of pieces of device class information. The device class information of the connected second electronic device 200 may be included in the plurality of pieces of prestored device class information. When the third electronic device accesses through a BR/EDR, the first electronic device 100 may increase a connection interval of the second electronic device 200 based on the device class information of the second electronic device 200.

The device class information of the second electronic device 200 may be obtained based on CoD information carried in an advertisement of the second electronic device 200, or may be obtained based on PNP infor in a device information service (device information service, DIS) in a generic attribute profile (generic attribute profile, GATT). The following describes two cases.

(1) Obtain the Device Class Information Based on the CoD Information.

For example, when the second electronic device 200 is in an inquiry scan state, the second electronic device 200 may respond to an ID packet, for example, may send an FHS packet. The FHS packet may carry the CoD information, that is, the device class information of the second electronic device 200. The CoD information may be further carried in an EIR (extended inquiry response) data packet or an advertising (advertising) data packet. The CoD may be a class of device specified according to a Bluetooth protocol, as shown in Table 1.

TABLE 1

| No. | Major device classes (Major Device Classes) |
|---|---|
| 1 | Computer (computer) |
| 2 | Phone (phone) |
| 3 | LAN/Network access point (LAN/Network Access Point) |
| 4 | Audio/Video (audio/video) |
| 5 | Peripheral (Peripheral) |
| 6 | Imaging (imaging) |
| 7 | Wearable (wearable) |
| 8 | Toy (Toy) |
| 9 | Health (Health) |
| 10 | Other |

Table 1 lists some major device classes according to a Bluetooth standard protocol. In the protocol, a 5-bit flag bit may be used to identify the major device class, for example, 00001 is used to identify the computer class, and 00010 is used to identify the phone class. For a specific device classes, refer to a Bluetooth standard.

In some embodiments, according to the Bluetooth protocol, the foregoing major device class may be further divided into minor classes. Using the audio/video class as an example, as shown in Table 2, the audio/video class may be divided into a plurality of minor classes.

TABLE 2

| No. | Minor device class field (minor device class field) |
|---|---|
| 1 | Wearable headset device (Wearable Headset Device) |
| 2 | Hands-free device (Hands-free Device) |
| 3 | Microphone (Microphone) |
| 4 | Loudspeaker (Loudspeaker) |
| 5 | Headphones (Headphones) |
| 6 | Portable audio (Portable Audio) |
| 7 | Car audio (Car audio) |
| 8 | Set-top box (Set-top box) |
| 9 | Hi-Fi audio device (Hi-Fi Audio Device) |
| 10 | Video recorder (VCR) |
| 11 | Video camera (Video Camera) |
| 12 | Camcorder (Camcorder) |
| 13 | Video monitor (Video Monitor) |
| 14 | Video display and loudspeaker (Video Display and Loudspeaker) |
| 15 | Video conferencing (Video Conferencing) |
| 16 | . . . |

Table 2 lists some minor classes in the audio and video class. In the protocol, a 6-bit flag bit may be used to identify the minor class. For example, 000001 is used to identify the wearable headset device, and 000010 is used to identify the hands-free device. For details, refer to a Bluetooth protocol specification.

In this embodiment of this application, the CoD information of the second electronic device 200 may include the major device class, or may include the minor device class. The device class information prestored in the first electronic device 100 may also be based on the major device class, or may be based on the minor device class.

It should be noted that a response message of the second electronic device 200 may carry the CoD information, and may further include a MAC address, an IP address, a device name, another parameter used to represent a capability of a peer device, and the like.

In some embodiments, in a process in which the first electronic device 100 pairs with and connects to the second electronic device 200, the first electronic device 100 may obtain a capability parameter of the second electronic device 200, for example, obtain a class or a version number of a Bluetooth service (profile) supported by the second electronic device 200. The first electronic device 100 may further determine a device class of the peer device by using the class of the Bluetooth service supported by the second electronic device 200. For example, if the second electronic device 200 supports an advanced audio distribution profile (advanced audio distribution profile, A2DP) and/or a hands-free profile (hands-free profile, HFP) service, it may be determined that the second electronic device is an audio/video device. For another example, if the second electronic device 200 supports the GATT, the second electronic device 200 may be a BLE device.

Generally, the profile defines a Bluetooth-based application. Each profile specification mainly includes a developer-specific interface, message format and standard (for example, audio compression), and components that use a Bluetooth protocol stack. Each profile corresponds to a UUID. A concept of the UUID in the Bluetooth is similar to a concept of a port in TCP/IP. Each UUID runs a service, and the Bluetooth service may be identified by using a universally unique identifier (universally unique identifier, UUID). Bluetooth services identified by different UUIDs are different, and each service corresponds to a universal, independent, and unique UUID. Common services are shown in Table 3.

TABLE 3

| UUID | Bluetooth service |
|---|---|
| A2DP_UUID | A2DP (Advanced Audio Distribution Profile) |
| HFP_UUID | HFP (Hands-Free Profile) |

A2DP_UUID indicates the A2DP advanced audio distribution profile. The A2DP defines parameters and procedures for establishing audio and video streams. HFP_UUID indicates the HFP hands-free profile, providing basic functions for communication between a mobile phone and a headset.

(2) Obtain the Device Class Information Based on the PNP Infor in the DIS in the GATT.

In this embodiment of this application, the PNP infor includes a number assigned by a global organization to a vendor, a product ID defined by the vendor, and product version information defined by the vendor. For example, the PNP infor includes a vendor ID and a product ID. The vendor ID and the product ID may identify that the Bluetooth device is a device manufactured by Huawei Technologies Co., Ltd., and may also identify device class information, for example, a keyboard, a mouse, or a band. In this embodiment of this application, not limited to the PNP infor, the first electronic device 100 may further obtain the device class information of the second electronic device 200 based on another feature value in the DIS.

The prestored device class information of the first electronic device 100 may also include the vendor ID and/or the product ID. When a vendor ID and/or a product ID of the second electronic device 200 are/is included in a prestored vendor ID and/or product ID, the device class information of the second electronic device 200 is included in the prestored device class information. When the third electronic device accesses through the BR/EDR, the first electronic device 100 may increase the connection interval of the second electronic device 200.

In a possible implementation, only when the second electronic device 200 is a device manufactured by Huawei Technologies Co., Ltd., the first electronic device 100 increases the connection interval of the second electronic device 200.

In some other embodiments of this application, the first electronic device 100 may set a priority for the stored device class information. In a possible embodiment of this application, the first electronic device 100 may learn, based on device class information of the Bluetooth device, that the Bluetooth device is a band, a Bluetooth watch, a Bluetooth keyboard, a Bluetooth mouse, a stylus, a Bluetooth headset, a Bluetooth speaker, or the like. For example, refer to Table 4. Table 4 is an example of a correspondence between a Bluetooth device and a priority provided in this embodiment of this application.

TABLE 4

| Bluetooth device | Priority |
|---|---|
| Band, watch, Bluetooth keyboard, and Bluetooth mouse | First priority |
| Bluetooth headset and Bluetooth speaker | Third priority |

As shown in Table 4, the third priority is higher than the first priority. The third electronic device 300 is a Bluetooth headset. The first electronic device 100 may learn, based on the device class information of the second electronic device 200, that the second electronic device 200 is a band. The first electronic device 100 may further learn, according to Table 4, that a priority of the second electronic device 200 is lower than a priority of the first electronic device 100. In this case, the first electronic device 100 may increase the connection interval of the second electronic device 200, that is, perform steps S204 to S207.

In this embodiment of this application, not limited to the Bluetooth devices listed in Table 1, the Bluetooth device with the first priority may further include another BLE device, and the Bluetooth device with the third priority may further include another conventional Bluetooth device. These conventional Bluetooth devices with high priority are configured to establish a conventional Bluetooth connection to the first electronic device 100, and exchange service data having a relatively high real-time requirement.

Optionally, the first electronic device may alternatively use a Bluetooth device connected to the BR/EDR as the Bluetooth device with the third priority. That is, the first electronic device 100 establishes a BLE connection to the second electronic device 200, and when the third electronic device 300 establishes a Bluetooth connection to the first electronic device 100, the first electronic device 100 increases the connection interval of the second electronic device 200 based on the BLE connection of the second electronic device 200 and the BR/EDR connection of the third electronic device 300.

For example, refer to Table 5. Table 5 is another example of a correspondence between a Bluetooth device and a priority provided in this embodiment of this application.

TABLE 5

| Bluetooth device | Priority |
| --- | --- |
| Band, watch, Bluetooth keyboard, and Bluetooth mouse | First priority |
| Bluetooth headset and Bluetooth speaker | Third priority |
| Stylus | Second priority |

As shown in Table 5, the first electronic device 100 may store Bluetooth devices whose priorities are "first priority", "third priority", and "second priority".

In a possible embodiment, the first priority is lower than the second priority, and the second priority is higher than the first priority and lower than the third priority. Among the three priorities, when a Bluetooth device with a higher priority accesses the first electronic device 100, the first electronic device 100 increases a connection interval of a Bluetooth device with a lower priority. For example, the first electronic device 100 establishes a BLE connection to the Bluetooth keyboard, and further establishes a BLE connection to the stylus. When the Bluetooth headset establishes a Bluetooth connection to the first electronic device 100, the first electronic device 100 may select the band from the band and the stylus based on the priority correspondence shown in Table 5, and increase a connection interval of the band.

For another example, the first electronic device 100 establishes a Bluetooth connection to the band. When the stylus establishes a Bluetooth connection to the first electronic device 100, the first electronic device 100 may increase the connection interval of the band based on the priority correspondence shown in Table 5, that is, perform steps S204 to S207. In this way, time for occupying a channel by the band is reduced, and time for exchanging data between the stylus and the first electronic device 100 is increased.

In another possible embodiment, the second priority may alternatively be higher than the third priority. That is, a priority (the second priority) of the stylus may be higher than a priority (the third priority) of the Bluetooth headset. For example, the first electronic device 100 establishes a Bluetooth connection to the Bluetooth headset. When the stylus establishes a Bluetooth connection to the first electronic device 100, the first electronic device 100 may adjust a connection parameter of the Bluetooth headset based on the priority correspondence shown in Table 5, so that time for occupying a channel by the Bluetooth headset is reduced, and time for exchanging data between the stylus and the first electronic device 100 is increased. Optionally, the first electronic device 100 may also keep the connection parameter of the Bluetooth headset unchanged.

In another possible embodiment of this application, the first electronic device 100 may store a Bluetooth profile with a high priority, and the Bluetooth profile with the high priority includes the A2DP, the HFP, an HSP, and the like. The first electronic device 100 may further store a Bluetooth profile with a low priority, and the Bluetooth profile with the low priority includes the generic attribute configuration file (generic attribute profile, GATT), a GAP, an FTP, and the like. When a Bluetooth profile supported by the third electronic device 300 includes one or more of the A2DP, the HFP, and the HSP, and a Bluetooth profile supported by the second electronic device 200 includes one or more of the GATT, the GAP, and the FTP, the first electronic device 100 may increase the connection interval of the second electronic device 200 based on the stored Bluetooth profiles with high and low priorities, that is, perform steps S204 to S207.

S204: The first electronic device 100 sends a connection parameter request (LL_CONNECTION_PARAM_REQ) to the second electronic device 200.

A host of the first electronic device 100 may send a connection parameter update (LE connection update) request to a controller through an HCI, and a controller of the first electronic device 100 sends the connection parameter request to a controller of the second electronic device 200. The connection parameter update request may carry a maximum value and a minimum value of a connection interval. The controller of the first electronic device 100 may set an update connection interval of the second electronic device 200 within a range between the maximum value and the minimum value of the connection interval.

In this embodiment of this application, the first electronic device 100 may detect data currently exchanged with the second electronic device 200. If it is detected that the current data is heartbeat data, sleep data, or a control signal, or another data class having a relatively low real-time requirement, the connection parameter request is sent to the second electronic device 200. For example, when it is detected that the data currently exchanged with the second electronic device 200 is the heartbeat data, the sleep data, or an empty packet, step S205 may be performed.

In this embodiment of this application, the LL_CONNECTION_PARAM_REQ may be triggered by using a protocol data unit (protocol data unit, PDU). The PDU may be initiated by the host (namely, the first electronic device 100).

S205: The second electronic device 200 sends a connection parameter response (LL_CONNECTION_PARAM_RSP) to the first electronic device 100.

S206: The first electronic device 100 sends the connection parameter update request (LL_CONNECTION_UPDATE_REQ) to the second electronic device 200, to increase the connection interval.

The connection parameter update request may carry an updated connection parameter (for example, a second connection parameter), and the second connection parameter may include a second connection interval, a second latency, and a second supervision timeout. The second connection interval may be greater than the first connection interval. The second connection interval, the second latency, and the second supervision timeout may meet: the second supervision timeout>(1+the second latency)$^x$ the second connection interval×2.

S207: The first electronic device 100 exchanges data with the second electronic device 200 based on the updated connection parameter.

In this embodiment of this application, the second electronic device 200 may store a connection parameter range of the second electronic device 200, and the connection parameter range includes, for example, the maximum value and the minimum value of the connection interval. If the second electronic device 200 finds that the updated connection parameter exceeds the connection parameter range of the second electronic device 200, or the updated connection parameter is incorrect, a host layer of the second electronic device 200 rejects an update, the second electronic device 200 may reply LL_REJECT_IND_EXT to the first electronic device 100, and the process ends.

S208: The first electronic device 100 exchanges audio data with the third electronic device 300 within a time period other than a time period during which the second electronic device 200 occupies a channel.

In some other embodiments of this application, in step S203, the first electronic device 100 may further identify a device class of the third electronic device 300. When it is detected that the device class of the third electronic device 300 is an audio and video device, steps S204 to S206 may be performed to adjust a connection parameter of the second electronic device 200, so as to increase the connection interval.

In this embodiment of this application, the first electronic device determines, by using the CoD or the Bluetooth profile supported by the third electronic device, that the third electronic device is an audio device.

According to the Bluetooth connection method described in FIG. 9, time for which a connection event of the second electronic device 200 occupies a channel of the first electronic device 100 may be reduced, and time for exchanging data between the third electronic device 300 and the first electronic device 100 may be increased, thereby improving a throughput speed of exchanging data between the third electronic device 300 and the first electronic device 100, and improving real-time performance of audio data transmission when the third electronic device 300 exchanges audio data with the first electronic device 100.

In this embodiment of this application, in the Bluetooth connection to the first electronic device 100, when time for the second electronic device 200 to exchange data overlaps time for the third electronic device 300 to exchange data, the first electronic device 100 may select one Bluetooth device from the second electronic device 200 and the third electronic device 300 based on data transmitted by the two Bluetooth devices, and preferentially transmit data of the Bluetooth device. For example, the first electronic device 100 detects that data of the second electronic device 200 is text data, sleep data, and data of the third electronic device 300 is audio data. Because the audio data has a high real-time requirement, the first electronic device 100 may transmit the data of the third electronic device 300 within an overlapping time period, and delay transmitting the data of the second electronic device 200.

In this embodiment of this application, the second electronic device 200 and the third electronic device 300 are not limited to the product examples described in Table 1 and Table 2. The second electronic device 200 may be another device that establishes a BLE connection to the first electronic device 100, and the third electronic device 300 may also be another device that has a relatively high real-time requirement for exchanging data. For the another device that has a relatively high real-time requirement for exchanging data, the first electronic device 100 may also increase the connection interval of the second electronic device 200, to make more channel occupancy time for the device that has a relatively high real-time requirement for exchanging data.

In some embodiments of this application, when the Bluetooth profile of the third electronic device 300 includes one or more of the following: the A2DP and the HFP, the Bluetooth profile of the third electronic device 300 is an audio data class. Specifically, the first electronic device 100 may query the Bluetooth profile of the third electronic device 300 when performing SDP negotiation with the third electronic device. In an SDP negotiation process, the third electronic device 300 may reply a media type (Media Type), for example, an audio stream, supported by the third electronic device 300. The first electronic device 100 may determine, based on the media type supported by the third electronic device 300, that the Bluetooth profile of the third electronic device 300 is the audio data class. When the Bluetooth profile of the third electronic device 300 is the audio data class, and the third electronic device 300 accesses, the first electronic device 100 may also increase the connection interval of the second electronic device 200.

Figure 10:
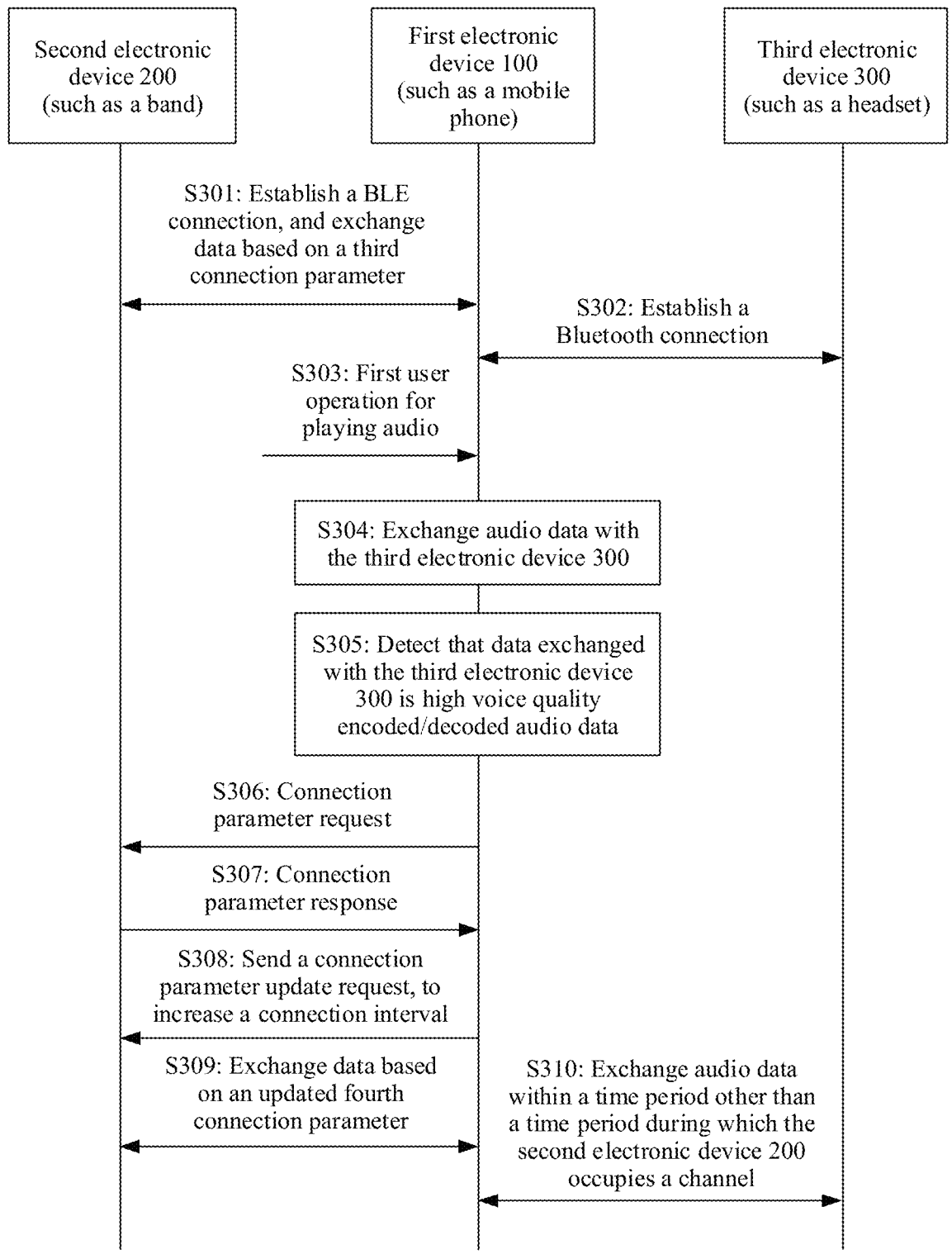
FIG. 10 is a schematic flowchart of another Bluetooth connection method according to an embodiment of this application.

FIG. 10 is a schematic flowchart of another Bluetooth connection method according to an embodiment of this application. In the Bluetooth connection method, the first electronic device 100 (for example, a mobile phone) may be connected to a band (the second electronic device 200) and a headset (the third electronic device 300). When it is detected that the mobile phone exchanges high voice quality encoded audio with the headset through a Bluetooth connection, a connection interval of a Bluetooth connection between the mobile phone and the band may be increased. As shown in FIG. 10, the method includes steps S301 to S310.

S301: The first electronic device 100 establishes a BLE connection to the second electronic device 200, and exchanges data based on a third connection parameter.

The third connection parameter may include a third connection interval. The third connection interval may be equal to or not equal to a first connection interval. This is not limited in this embodiment of this application.

S302: The first electronic device 100 establishes a Bluetooth connection to the third electronic device 300.

In this embodiment of this application, step S302 may be performed after step S301, or may be performed before step S301. This is not limited in this embodiment of this application. The Bluetooth connection between the first electronic device 100 and the third electronic device 300 may be a BLE connection, or may be a BR/EDR connection.

S303: The first electronic device 100 receives a first user operation for playing audio.

In this embodiment of this application, the first user operation for playing audio may include: a user operation performed on the play control 506 (in a paused state) on the audio playback interface 50 described in FIG. 8A, a user operation performed on the answer control 601 on the incoming call interface 60 described in FIG. 8B, a user operation performed on the Bluetooth headset option 8023 on the audio switching interface 80 described in FIG. 8D, and a user operation performed on a control used to play audio and videos on a video playback interface. This is not limited to a user operation for playing audio. When the first electronic device 100 displays the call interface 70 described in FIG. 8C, and detects that a peer end connects a call channel, steps S304 and S305 are performed.

The user operation for playing audio may further include the user operation performed on the control used to play audio and videos on the video playback interface.

S304: The first electronic device 100 exchanges audio data with the third electronic device 300.

When there are a plurality of audio playback apparatuses, for example, a mobile phone earpiece, a speaker, and a third electronic device (for example, a headset) that is connected through Bluetooth, the first electronic device 100 may select, by default, the headset to play audio data, and the first electronic device 100 exchanges the audio data with the third electronic device 300. In another possible implementation, the first electronic device 100 may select, in response to a user operation, the headset to play audio data. For example, in FIG. 8D, in response to a user operation performed on the Bluetooth headset option 8023, the first electronic device 100 determines to play the audio data by using the third electronic device 300.

S305: The first electronic device 100 detects that the data exchanged with the third electronic device 300 is high voice quality encoded/decoded audio data.

In this embodiment of this application, high voice quality codec may include, for example, one or more of the following: LDAC, high-resolution wireless audio (HiRes wireless audio, HWA), aptX HD, and advanced audio coding (advanced audio coding, AAC). The first electronic device 100 may query a codec format supported by the third electronic device 300, and determine a codec format of the exchanged audio data. For example, the first electronic device 100 detects that the codec format supported by the third electronic device 300 includes LDAC, high-resolution wireless audio (HiRes wireless audio, HWA), and sub-band coding (sub-band coding, SBC). If the first electronic device 100 determines that the LDAC or the HWA is used as the codec format, the first electronic device 100 determines that the data exchanged with the third electronic device 300 is the high voice quality encoded/decoded audio data.

In this embodiment of this application, when detecting that the first electronic device 100 exchanges data with the second electronic device 200 by using one or more Bluetooth profiles of an A2DP and an HFP, the first electronic device 100 may determine to exchange audio data with the second electronic device 200.

In some embodiments of this application, when detecting that the data exchanged with the third electronic device 300 is audio data, the first electronic device 100 may perform steps S306 to S308 to increase a connection interval of a Bluetooth connection of the second electronic device 100.

S306: The first electronic device 100 sends a connection parameter request to the second electronic device 200.

S307: The second electronic device 200 sends a connection parameter response to the first electronic device 100.

S308: The first electronic device 100 sends a connection parameter update request to the second electronic device 200, to increase the connection interval.

The connection parameter update request may carry an updated connection parameter (for example, a fourth connection parameter), and the fourth connection parameter may include a fourth connection interval, a fourth latency, and a fourth supervision timeout. The fourth connection interval may be greater than the third connection interval. The fourth connection interval, the fourth latency, and the fourth supervision timeout may meet: the fourth supervision timeout>(1+the fourth latency)×the fourth connection interval×2, so that the first electronic device 100 and the second electronic device 200 are not abnormally disconnected.

S309: The first electronic device 100 exchanges data with the second electronic device 200 based on the updated fourth connection parameter.

S310: The first electronic device 100 exchanges audio data with the third electronic device 300 within a time period other than a time period during which the second electronic device 200 occupies a channel.

In this embodiment of this application, there may be a plurality of Bluetooth devices (the second electronic devices 200) that establish BLE connections to the first electronic device 100. In this case, in steps S306 to S308, the first electronic device 100 may detect a class of data exchanged with each of the plurality of Bluetooth devices. The first electronic device 100 may select a Bluetooth device that exchanges data with a relatively low real-time requirement, to increase a connection interval of the Bluetooth device. For example, if data exchanged by a Bluetooth device is a control signal or text data, and a real-time requirement is relatively low, in steps S306 to S308, the first electronic device 100 may increase a connection interval of the Bluetooth device.

In some embodiments of this application, if there are a plurality of Bluetooth devices that establish BLE connections to the first electronic device 100, when an amount of data exchanged with one of the Bluetooth devices is relatively large, the first electronic device 100 may alternatively increase a connection interval of another Bluetooth device of a BLE connection.

For example, the first electronic device 100 is connected to a band A through the BLE, and is connected to a Bluetooth keyboard. When the band A needs to transmit sleep data of several days to the first electronic device 100, the first electronic device 100 may increase a connection interval of a BLE connection to the Bluetooth keyboard. Refer to the sequence diagram described in FIG. 4A. When the connection interval of the BLE connection to the Bluetooth keyboard is increased, time for which data exchanging between the Bluetooth keyboard and the first electronic device 100 occupies a channel of the first electronic device can be reduced, and time for exchanging data between the band A and the first electronic device 100 can be increased, thereby improving a throughput speed of exchanging data between the band A and the first electronic device 100, and improving real-time performance of data transmission.

The first electronic device 100 establishes a BLE connection to the second electronic device 200. In some embodiments of this application, when the third electronic device 300 accesses through Bluetooth, the first electronic device 100 may increase the connection interval of the second electronic device 200 based on device class information of the second electronic device 200. Specifically, when it is detected that the device class information of the second electronic device 200 is included in prestored device class information, the connection interval of the Bluetooth connection between the first electronic device 100 and the second electronic device 200 is increased. When the first electronic device 100 transmits high voice quality coded audio to the third electronic device 300 through the Bluetooth connection, the connection interval of the Bluetooth connection between the first electronic device 100 and the second electronic device 200 may be further increased.

For example, Bluetooth devices that have established a BLE connection to the first electronic device 100 include a Bluetooth device A and a Bluetooth device B. Connection intervals of the Bluetooth device A and the Bluetooth device B are respectively 10 ms and 15 ms. When a Bluetooth device C accesses the first electronic device 100 through Bluetooth, the first electronic device 100 may adjust the connection interval of the Bluetooth connection between the first electronic device 100 and the Bluetooth device A to 15 ms, and adjust the connection interval of the Bluetooth connection between the first electronic device 100 and the Bluetooth device B to 18 ms based on one or more of Bluetooth profiles and device class information of the Bluetooth devices A and B. The first electronic device 100 transmits high voice quality coded audio data to the Bluetooth device C through the Bluetooth connection, and data exchanged between the first electronic device 100 and the Bluetooth device A or the Bluetooth device B is heartbeat data, sleep data, or a control signal. The first electronic device 100 may adjust the connection interval of the Bluetooth connection between the first electronic device 100 and the Bluetooth device A to 20 ms, and adjust the connection interval of the Bluetooth connection between the first electronic device 100 and the Bluetooth device B to 25 ms.

In this way, time for which data exchanging between the first electronic device 100 and the Bluetooth device A or the Bluetooth device B occupies a channel of the first electronic device 100 can be reduced, and time for exchanging data between the Bluetooth device C and the first electronic device 100 can be increased, thereby improving a throughput speed of exchanging data between the Bluetooth device C and the first electronic device 100, and improving real-time performance of audio data transmission.

In this embodiment of this application, not limited to the audio data or the high voice quality encoded/decoded audio data, for other service data having a high real-time requirement, the first electronic device 100 may also increase the connection interval of the Bluetooth connection to the second electronic device, to make more channel occupancy time for the service data having a relatively high real-time requirement.

Figure 11:
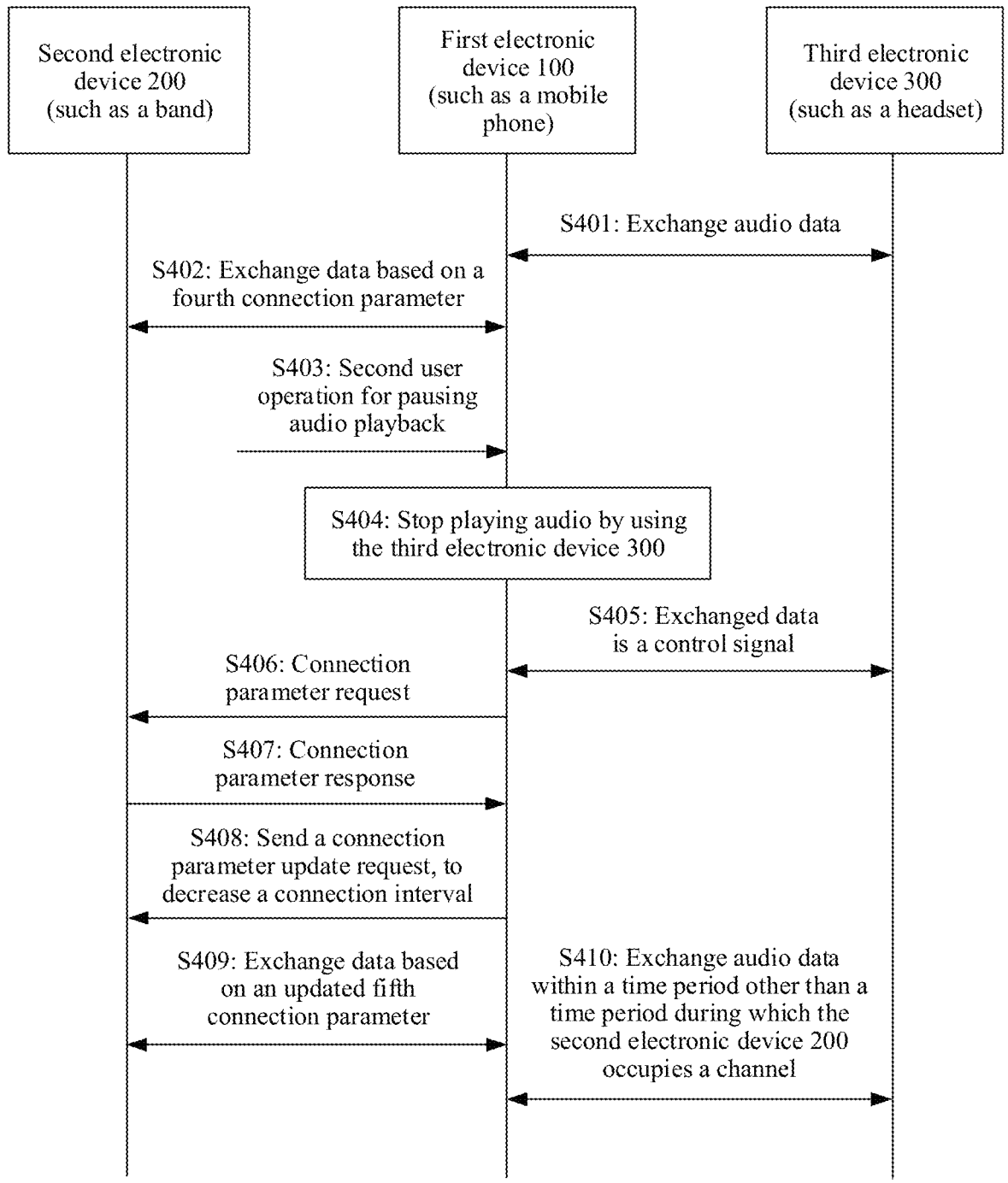
FIG. 11 is a schematic flowchart of still another Bluetooth connection method according to an embodiment of this application.

According to the embodiment described in FIG. 10, after a connection interval of a Bluetooth connection between the first electronic device 100 (for example, a mobile phone) and the third electronic device 300 (for example, a band) is increased, when the mobile phone exchanges data other than audio data, for example, a control signal, with a headset through the Bluetooth connection, the mobile phone may decrease a connection interval of a Bluetooth connection between the mobile phone and the band. For details, refer to FIG. 11. FIG. 11 is a schematic flowchart of still another Bluetooth connection method according to an embodiment of this application. As shown in FIG. 11, the method includes steps S401 to S410.

S401: The first electronic device 100 exchanges audio data with the third electronic device 300 through a Bluetooth connection.

S402: The first electronic device 100 exchanges data with the second electronic device 200 based on a fourth connection parameter.

The fourth connection parameter may be the updated connection parameter obtained in step S309 in the method described in FIG. 9. The data exchanged between the first electronic device 100 and the second electronic device 200 may be heartbeat data, sleep data, or a control signal.

S403: The first electronic device 100 detects a second user operation for pausing audio playback.

In this embodiment of this application, the second user operation for pausing audio playback may include a user operation performed on the play control 506 (in a playing state) on the audio playback interface 50 described in FIG. 8A, and the paused audio data is an audio file named "Dream it possible".

A user operation for pausing audio playback may include a user operation performed on the decline control 602 on the incoming call interface 60 described in FIG. 8B, and the paused audio data is system audio data corresponding to an incoming call ringtone. Similarly, the user operation for pausing audio playback may include a user operation performed on a decline control on the call interface 70 described in FIG. 8C, and the paused audio data is system audio data corresponding to a ring tone.

S404: The first electronic device 100 stops playing audio by using the third electronic device 300.

After audio data exchanging with the third electronic device 300 is suspended, the first electronic device 100 and the third electronic device 300 may still continue to exchange data, for example, a control signal, so as to maintain a Bluetooth connection between the two devices.

S405: If the data exchanged between the first electronic device 100 and the third electronic device 300 is the control signal, step S406 is performed, to reduce a connection interval of the second electronic device 200.

For S406 and S407, refer to descriptions of steps S204 and S205.

S408: The first electronic device 100 sends a connection parameter update request to the second electronic device 200, to decrease the connection interval.

S409: The first electronic device 100 exchanges data with the second electronic device 200 based on an updated fifth connection parameter.

The fifth connection parameter may include a fifth connection interval, and the fifth connection interval is less than a fourth connection interval. The fifth connection interval may be equal to or not equal to a third connection interval. This is not limited in this embodiment of this application.

S410: The first electronic device 100 exchanges audio data with the third electronic device 300 within a time period other than a time period during which the second electronic device 200 occupies a channel.

In the Bluetooth connection method described in FIG. 11, when the data exchanged between the third electronic device 300 and the first electronic device 100 has a relatively low real-time requirement, a connection interval of the second electronic device 200 may be reduced, so as to improve stability and a throughput speed of a Bluetooth connection of the second electronic device 200.

In this embodiment of this application, adjustment is not limited to a connection parameter, for example, a connection interval and a slave latency, of the second electronic device 200 of a BLE connection. The first electronic device 100 may further adjust another parameter, for example, an advertising interval, of the second electronic device 200, to increase time for which data exchanging between the third electronic device 300 and the first electronic device 100 occupies a channel of the first electronic device 100. The advertising interval indicates a minimum interval between two advertising events, and a value generally ranges from 20 ms to 10.24 s.

Not limited to a Bluetooth connection, this embodiment of this application may be further used for another wireless communications connection, for example, a Wi-Fi connection. This is not limited in this embodiment of this application.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in the embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or a compact disc.

What is claimed is:

1. A first electronic device, wherein the first electronic device comprises:
    a touchscreen, wherein the touchscreen comprises a touch-sensitive surface and a display;
    one or more processors;
    a Bluetooth chip, wherein the Bluetooth chip supports a classic Bluetooth BR/EDR function and a Bluetooth low energy BLE function;
    a memory, wherein the memory stores a plurality of applications, and one or more computer programs, the one or more computer programs comprise instructions, and when the instructions are executed by the first electronic device, the first electronic device is enabled to perform the following steps:
    establishing a BLE connection to a second electronic device, and exchanging data with the second electronic device based on a first connection interval, wherein the first connection interval is a first value;
    establishing a BR/EDR connection to a third electronic device;
    receiving a first user operation for playing audio;
    adjusting the first connection interval to a second value, after the receiving, when data exchanged with the third electronic device is audio data, and the second value is greater than the first value.

2. The first electronic device according to claim 1, wherein when the instructions are executed by the first electronic device, the first electronic device is enabled to further perform the following step:
    when a codec format of the data exchanged with the third electronic device is one or more of LDAC, high-resolution wireless audio HWA, aptX HD, and advanced audio coding AAC, adjusting the first connection interval of the second electronic device to the second value.

3. The first electronic device according to claim 1, wherein when the instructions are executed by the first electronic device, the first electronic device is enabled to further perform the following step:
    adjusting the first connection interval of the second electronic device to a third value when the data exchanged with the third electronic device is empty data or a control signal, wherein the third value is less than the second value.

4. The first electronic device according to claim 3, wherein before the data exchanged between the first electronic device and the third electronic device is the empty data or the control signal, when the instructions are executed by the first electronic device, the first electronic device is enabled to further perform the following step:
    receiving a second user operation for pausing audio playback.

5. A Bluetooth connection method, wherein the method comprises:
    establishing, by a first electronic device, a Bluetooth low energy BLE connection to a second electronic device, and exchanging data with the second electronic device based on a first connection interval, wherein the first connection interval is a first value; and
    establishing, by the first electronic device, a classic Bluetooth BR/EDR connection to a third electronic device;
    receiving, by the first electronic device, a first user operation for playing audio;
    adjusting, by the first electronic device, the first connection interval to a second value, after the receiving, when data exchanged with the third electronic device is audio data, and the second value is greater than the first value.

6. The method according to claim 5, wherein the adjusting, by the first electronic device, the first connection interval to a second value when data exchanged with the third electronic device is audio data comprises:

adjusting, by the first electronic device, the first connection interval to the second value when a codec format of the data exchanged with the third electronic device is one or more of LDAC, high-resolution wireless audio HWA, aptX HD, and advanced audio coding AAC.

7. The method according to claim 5, wherein after the adjusting, by the first electronic device, the first connection interval to a second value when data exchanged with the third electronic device is audio data, the method further comprises:

adjusting, by the first electronic device, the first connection interval to a third value when the data exchanged with the third electronic device is empty data or a control signal, wherein the third value is less than the second value.

8. The method according to claim 7, wherein before the adjusting, by the first electronic device, the first connection interval to a third value when the data exchanged with the third electronic device is empty data or a control signal, the method further comprises:

receiving, by the first electronic device, a second user operation for pausing audio playback.

\* \* \* \* \*